United States Patent
Mueck et al.

(10) Patent No.: US 9,191,929 B2
(45) Date of Patent: *Nov. 17, 2015

(54) METHODS AND APPARATUS FOR PROVIDING DYNAMIC INFORMATION IN A WIRELESS INFORMATION CHANNEL

(71) Applicant: Apple Inc., Cupertino, CA (US)

(72) Inventors: Markus Mueck, Unterhaching (DE); Andreas Schmidt, Braunschweig (DE)

(73) Assignee: APPLE INC., Cupertino, CA (US)

( * ) Notice: Subject to any disclaimer, the term of this patent is extended or adjusted under 35 U.S.C. 154(b) by 238 days.

This patent is subject to a terminal disclaimer.

(21) Appl. No.: 13/846,649

(22) Filed: Mar. 18, 2013

(65) Prior Publication Data

US 2013/0279431 A1     Oct. 24, 2013

Related U.S. Application Data

(63) Continuation of application No. 12/512,761, filed on Jul. 30, 2009, now Pat. No. 8,400,974.

(51) Int. Cl.
*H04W 72/04* (2009.01)
*H04W 48/10* (2009.01)
*H04W 48/16* (2009.01)

(52) U.S. Cl.
CPC .......... *H04W 72/0406* (2013.01); *H04W 48/10* (2013.01); *H04W 48/16* (2013.01)

(58) Field of Classification Search
CPC ....................................................... H04B 1/76
See application file for complete search history.

(56) References Cited

U.S. PATENT DOCUMENTS

| 2005/0232181 | A1 | 10/2005 | Park et al. | |
| 2008/0268863 | A1 | 10/2008 | Pedersen et al. | |
| 2009/0036153 | A1 | 2/2009 | Yamazaki et al. | |
| 2009/0247157 | A1* | 10/2009 | Yoon et al. | 455/434 |
| 2010/0113083 | A1* | 5/2010 | Luo et al. | 455/515 |
| 2010/0234063 | A1* | 9/2010 | Mueck et al. | 455/552.1 |
| 2011/0086662 | A1* | 4/2011 | Fong et al. | 455/517 |

FOREIGN PATENT DOCUMENTS

| JP | 2010-526653 | 8/2010 |
| WO | 02/089434 | 11/2002 |
| WO | 2007/071600 | 6/2007 |
| WO | 2007/091420 | 8/2007 |
| WO | 2007/111563 | 10/2007 |

(Continued)

*Primary Examiner* — Habte Mered
(74) *Attorney, Agent, or Firm* — Fay Kaplun & Marcin, LLP

(57) ABSTRACT

Methods and apparatus to enable a wireless network system to dynamically change information channel message broadcasts. In one aspect, cellular network systems optimize pilot channel message delivery based at least in part on one or more network parameters. Base stations and/or cellular devices can dynamically configure the pilot channel message delivery or reception based on the network parameters. For example, such flexible pilot channel message delivery may more frequently deliver prioritized pilot channel messages, and less frequently broadcast low priority messages. Cellular subscribers with appropriately enabled user equipment may improve their power and applications performance through implementation of the invention. Furthermore, base stations may reclaim the freed cellular resources to support other services. Legacy subscribers are advantageously not affected.

18 Claims, 20 Drawing Sheets

(56) References Cited

FOREIGN PATENT DOCUMENTS

| WO | 2007/127993 | 11/2007 |
| WO | 2008/139407 | 11/2008 |
| WO | 2009/012272 | 1/2009 |
| WO | 2010/024135 | 3/2010 |

* cited by examiner

FIG. 4

METHODS AND APPARATUS FOR PROVIDING DYNAMIC INFORMATION IN A WIRELESS INFORMATION CHANNEL

PRIORITY AND RELATED APPLICATIONS

This application is a continuation of and claims priority to co-owned, U.S. patent application Ser. No. 12/512,761 entitled "METHODS AND APPARATUS FOR PROVIDING DYNAMIC INFORMATION IN A WIRELESS INFORMATION CHANNEL", filed Jul. 30, 2009 (issuing as U.S. Pat. No. 8,400,974 on Mar. 19, 2013), which is incorporated by reference herein in its entirety.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND OF THE INVENTION

1. Field of Invention

The present invention relates generally to the field of wireless communication and data networks. More particularly, in one exemplary aspect, the invention is directed to methods and apparatus for receiving selected segments of system information.

2. Description of Related Technology

Universal Mobile Telecommunications System (UMTS) is an exemplary implementation of a "third-generation" or "3G" cellular telephone technology. The UMTS standard is specified by a collaborative body referred to as the $3^{rd}$ Generation Partnership Project (3GPP). The 3GPP has adopted UMTS as a 3G cellular radio system targeted for inter alia European markets, in response to requirements set forth by the International Telecommunications Union (ITU). The ITU standardizes and regulates international radio and telecommunications. Enhancements to UMTS will support future evolution to fourth generation (4G) technology.

A current topic of interest is the further development of UMTS towards a mobile radio communication system optimized for packet data transmission through improved system capacity and spectral efficiency. In the context of 3GPP, the activities in this regard are summarized under the general term "LTE" (for Long Term Evolution). The aim is, among others, to increase the maximum net transmission rate significantly in the future, namely to speeds on the order of 300 Mbps in the downlink transmission direction and 75 Mbps in the uplink transmission direction.

Information and Pilot Channels—

Information channels (such as Pilot Channels) are used in many prior art cellular mobile radio communication systems. Such channels provide user equipment (UE) with useful information such as for example broadcasts of basic system information. Such information may be crucial during, inter alia, initial "wake-up" and registration, estimating potential base station (BS) service reception for handover (i.e. hand-off), etc. Various approaches to information (e.g., pilot) channel messaging are evidenced throughout the prior art. For example, in Interim Standard 95 (IS-95, CDMA), a pilot channel is used by mobile devices to initially determine the existence of base stations, and/or support multipath compensation.

Unfortunately, such information channels have a relatively high cost in terms of bandwidth when compared to other useful data channels. Generally speaking, these channels are the most robust and simplest coded channels of the network. When compared to the rest of the network bandwidth utilization (which is densely coded), the information distribution (pilot) resources are significantly underutilized. In some cases, a cellular pilot channel may use up to a fifth of the overall spectral resources, while providing little to no additional information to the user equipment population during normal operation.

Therefore, improved methods and apparatus are needed for more efficiently allocating and using information or pilot channel resources. Pilot channels are provided such that users may use the available resources (spectrum, power, etc.) in the most efficient way possible. However, the pilot design itself is suboptimal; thus such improved methods and apparatus should retain pilot channel functionality (e.g., support wakeup, service handover, etc.) while substantially minimizing "fixed" allocations of spectral resources for pilot channel operation.

Furthermore, it is additionally recognized that corresponding improvements are needed for minimizing unnecessary decoding of information or pilot channel resources. Such receiver side improvements ideally should not require substantial changes to transceiver hardware or software.

SUMMARY OF THE INVENTION

The present invention satisfies the aforementioned needs by providing, inter alia, improved apparatus and methods for receiving selected segments of publicly broadcast system information, such as via a pilot or other information channel.

In a first aspect of the invention, a software-defined radio apparatus is disclosed. In one embodiment, the apparatus includes: a first wireless interface configured to receive a first pilot channel; at least one second wireless interface configured to receive one or more data channels; a first preamble detector in signal communication with the first wireless interface; one or more decoding resources; a digital processor; and a storage device in data communication with the processor, the storage device comprising a computer program. When executed by the digital processor, the program: assign, responsive to receiving an indication from the first preamble detector, a first set of the one or more decoding resources to decode the first pilot channel; and assign, in the absence of the indication, a second set of the one or more decoding resources to decode the one or more data channels.

In one variant, the apparatus is a cellular telephone compliant with Long Term Evolution (LTE) standards.

In another variant, the first wireless interface is a cellular interface, and the apparatus further includes a WLAN interface, and wherein the WLAN interface accesses system information via a different radio frequency channel than the first pilot channel. The apparatus may further include a second preamble detector adapted to detect a preamble associated with the different radio frequency channel.

In yet another variant, the first preamble detector includes logic configured to discriminate between preambles of interest and those not of interest to the software-defined radio apparatus. For instance, at least a portion of a received preamble includes at least one tag length value (TLV), and the discrimination between preambles of interest and those not of interest to the software-defined radio apparatus is based at least in part on the at least one TLV. Alternatively, at least a portion of a received preamble includes at least one pointer, and the discrimination between preambles of interest and those not of interest to the software-defined radio apparatus is based at least in part on the at least pointer.

In a second aspect of the invention, a method of efficiently transmitting a plurality of information elements via an information channel is disclosed. In one embodiment, the method includes: assigning an age-related value to each of the plurality of information elements; and for each transmission of the information channel: identifying a threshold age value; determining a subset of the plurality of information elements to be transmitted based at least in part on: (i) the threshold age value, and (ii) the age value of each information element; and transmitting: a detection element, the detection element identifying the threshold age value; a pointer, the pointer identifying the subset of information elements, and the subset of information elements.

In one variant, the method is performed by a Long Term Evolution (LTE) compliant macrocell within a cellular network, and the information channel is a pilot channel.

In another variant, each transmission of the information channel is performed according to a substantially periodic schedule.

In yet another variant, the detection element is a preamble, and the transmitting a pointer is performed after the transmitting of the preamble, but before transmitting of the subset of information elements.

In still another variant, the method allows one or more receivers within a wireless network to receive the transmitted detection element, pointer and information elements and selectively decode at least portions thereof based on one or more criteria specified with respective ones of the receivers. For example, the one or more criteria specified with respective ones of the receivers can relate to the age-related values. In one instance, the age-related values may include at least a first value and a second older value. In yet another instance, the age-related values is one or more timestamps.

In a third aspect of the invention, a method of selectively processing a plurality of control channel messages is disclosed. In one embodiment, the method includes: determining a selection criterion; monitoring a control channel for a first preamble, the first preamble corresponding to a first control channel message, the first control channel message being encoded with a value; and only decoding information elements associated with the first control channel message when the encoded value meets the selection criterion.

In one variant, the encoded value is a value relating to priority, and the selection criterion is a threshold priority value.

In another variant, the encoded value is a value relating to the age of one or more information elements contained in the control channel message, and the selection criterion is a threshold age value.

In yet another variant, the encoded value is a value relating to a timing index associated with the control channel message, and the selection criterion is a timing index value.

In a farther variant, the method further comprising using one or more pointers embedded within the first control channel message to selectively decode only a portion of a plurality of information elements within the message.

In another further variant, the encoded value is a value relating to a user-dependent-context, and the selection criterion comprises a user-context value. For instance, the encoded value may be a location-related value, and the selection criterion may comprise a direction of travel.

In a fourth aspect of the invention, base station apparatus is disclosed. In one embodiment, the base station apparatus is configured to efficiently transmit a plurality of information elements via a wireless information channel, and the apparatus includes: first logic configured to assign a context-related or age-related value to each of the plurality of information elements; and second logic configured to transmit: a detection element, and the information elements.

In one variant, the base station apparatus is an LTE-compliant macrocell configured to operate within an LTE cellular network, and the transmission is configured to occur over a pilot channel of the network.

In another variant, the second logic is further configured to transmit at least one pointer, the pointer indicating at least one location within the information elements relating to an information element having a particular one of the context-related or age-related values associated therewith.

In yet another variant, the context-related or age-related values comprise radio access technology (RAT)-specific values. For instance, the radio access technology (RAT)-specific values may be selected from the group consisting of: (i) a UMTS-related value; (ii) a WLAN-related value; and (iii) a GSM- or GPRS-related value.

In still a further variant, the context-related or age-related values comprise age-specific values, and at least one of the first or second logic is configured to selectively include ones of the information elements for transmission based on a relationship of the age-specific values and at least one selection criterion.

In a fifth aspect of the invention, a computer readable apparatus is disclosed. In one embodiment, the apparatus includes a storage medium, the storage medium including at least one computer program configured to, when executed by a processor on a mobile device operating within a wireless network: determine an information channel message selection criterion; monitor an information channel for a first preamble, the first preamble corresponding to a first message, the first message being encoded with a value; only decode information elements associated with the first message when the encoded value meets the selection criterion; and provide at least a portion of the decoded message to another process within the mobile device.

In one variant, the apparatus includes a data or program memory device in data communication with the processor, and the mobile device is a device having at least one cellular wireless interface.

In a sixth aspect of the invention, a method of performing a vertical handover between a first radio access technology (RAT) and a second RAT is disclosed. In one embodiment, the first and second RATs having at least some overlap in coverage, and the method includes: monitoring a first control channel transmitted by the second RAT; receiving a plurality of control messages via the channel; selectively decoding only a portion of the plurality of messages based at least in part on a receiver-specific criterion; determining the suitability of the second RAT based at least in part on the decoded portion of messages; and implementing a handover from the first RAT to the second RAT based at least in part on the determining.

A method of preamble discrimination on a wireless network is disclosed. In one embodiment, the method includes: receiving a request for one or more information elements of interest; receiving, via a wireless interface, at least one data structure including a plurality of information elements, the at least one data structure transmitted on a pilot channel; receiving a plurality of pairs of information elements transmitted on the pilot channel; selecting at least one preamble type, the at least one preamble type being selected from a set of preamble types stored in memory; decoding preambles corresponding to the plurality of pairs; and comparing the decoded preambles with the selected at least one preamble type.

In one variant, the individual ones of the pairs include a preamble and a pointer, and are respectively associated with the individual ones of the plurality of information elements, and the method further includes, based on at least the comparison, decoding pointers for a subset of the pairs to determine one or more information element locations; and based on at least the one or more determined locations, selectively decoding a portion of the information elements of the data structure.

In another variant, the locations correspond to one or more data lengths within the data structure.

In a further variant, at least a subset of the information elements include updates on services localized near the position of a base station associated with the pilot channel.

In another variant, the services include available radio access technologies (RATS).

In a yet variant, the request includes the at least one preamble type.

In exemplary implementations, at least a subset of the data structure is repeated on the pilot channel. In some cases, the repeating is based on the length of a frame in the wireless network.

In still other variants, the data structure is stored in memory after transmission on the pilot channel, and the method further includes retrieving the data structure from the memory prior to the decoding of the portion. In one such case, the data structure is stored responsive to a detected trigger event.

In some variants, the portion of information elements are decoded in a predetermined order based on a weight associated with the decoded preambles.

In still other cases, the comparing includes performing at least one correlation operation.

In one exemplary case, the at least one preamble type is associated with one or more age-related information. In one such implementation, the one or more age-related information include at least a first value, and a second older value. In other cases, the one or more age-related information includes one or more time stamps.

In a second embodiment, the method includes: receiving a request for one or more types of information portions; receiving a plurality of encoded data elements including at least one information portion and at least one preamble; decoding a subset of encoded data elements associated with the at least one preamble, where the preamble is associated with the at least one information portion; decoding the at least one preamble element; based at least in part on the at least one preamble element, determining the type of the at least one information portion; and based at least in part on the determined type, omitting a decode operation associated with the at least one information portion.

A non-transitory computer-readable apparatus configured to store one or more computer programs thereon is disclosed. In one embodiment, the one or more computer programs are configured to, when executed: receive a request, from a higher-layer software operation, for data elements having one or more specified attributes; receive, via a wireless interface, a pilot channel data structure including a plurality of data elements at a plurality of associated data lengths, where individual ones of the data elements include at least one associated attribute descriptor and at least one reference element; decode the at least one associated attribute descriptor for the individual ones of the data elements to determine respective attributes associated with the individual ones of the data elements; compare the respective attributes with the one or more specified attributes; based at least in part on the comparison, selectively decode one or more reference elements for a subset of the individual ones of the plurality of data elements to determine data lengths for the subset; and decode portions of the pilot channel library element based on the determined data lengths.

A software-defined radio apparatus is disclosed. In one embodiment, the software-defined radio apparatus includes: a storage device configured to store a set of preamble types; a wireless interface configured to receive a plurality of preambles respectively associated with a plurality of radio resources; and preamble discrimination logic in data communication with the memory element and the wireless interface. In one variant, the preamble discrimination logic is configured to: receive a request for a one or more information elements of interest; select at least one preamble type of interest associated with the one or more information elements of interest, the at least one preamble type of interest being selected from the set of preamble types; and forward the at least one preamble type of interest to the wireless interface for identification of instances of the at least one preamble type of interest among the plurality of preambles.

In one variant, the wireless interface is further configured to decode one or more pointers so as to determine a location within the plurality of radio resources, the location associated with the instances of the at least one preamble type of interest.

In another variant, the request for one or more information elements of interest includes at least one selection criterion. In one such case, the at least one selection criterion includes a time value, and the at least one preamble type of interest includes a time stamp.

Other features and advantages of the present invention will immediately be recognized by persons of ordinary skill in the art with reference to the attached drawings and detailed description of exemplary embodiments as given below.

BRIEF DESCRIPTION OF THE DRAWINGS

FIG. 4 is a graphical representation of an embodiment of a second sequence of transmissions of the exemplary CPC Frame of FIG. 2, where each subsequent transmission is decremented according to a first method of the invention.

DETAILED DESCRIPTION OF THE INVENTION

Figure 1:
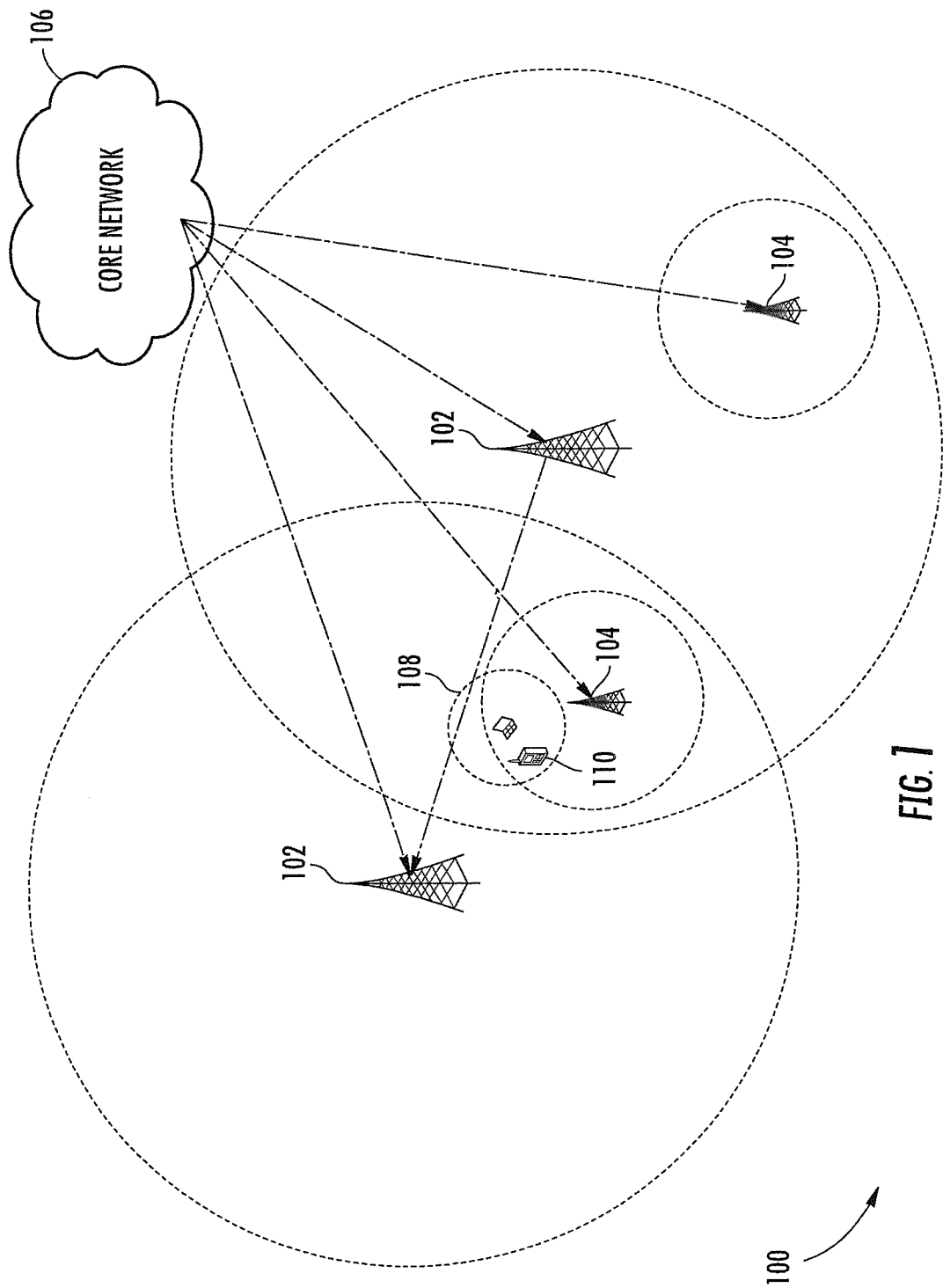
FIG. 1 is a graphical representation of an exemplary heterogeneous Radio Access Network (RAN) providing a first, second and third different Radio Access Technologies (RATs), useful for implementing one or more aspects of the present invention.

Reference is now made to the drawings, wherein like numerals refer to like parts throughout.
Overview In one aspect, the present invention discloses, inter cilia, methods and apparatus for modifying public broadcasts of system information, such that individual segments of the information may be selectively extracted. In one embodiment, one or more segments of system information for public broadcast (e.g., pilot channel information) are encapsulated within a segmented public broadcast (over a pilot channel) transmitted by a base station. Each of the segments is uniquely identifiable within the segmented public broadcast. The base station advantageously provides a low complexity preamble for fast detection, and indicia of the transmission segmentation. An enabled receiver (e.g., cellular UE) targets its decoding resources to the segments of interest.

In one exemplary variant, the user equipment (UE) adjusts its decoding resources for pilot information based on individual requirements, thus better utilizing their overall decoding resources. Complementary advantages for base stations (BSs) include, inter cilia, a reduction of pilot channel transmissions, thereby minimizing redundant pilot channel messaging. Furthermore, methods are disclosed enabling the BS and UE to dynamically manage pilot resources in concert or cooperation, so as to best service varying usage requirements.

In another aspect of the invention, methods and apparatus are disclosed for a time-varying segmented pilot channel. In one embodiment, indicia are provided to uniquely identify the constituent pilot channel context information segments. Each segmented pilot channel includes a portion of the comprehensive context information, the portion of context information being selected based on a prioritization scheme of the embedded context information. Each UE may individually opt to decode the segmented pilot channel with varying amounts of its decoding resources. In one such implementation, the UE bases its decoding behavior on an initial low-complexity preamble decoding, where the preamble provides information regarding the segmented pilot channel contents.

Exemplary apparatus and methods for Cognitive Pilot Channel (CPC) operation for use within an LTE-Advanced architecture are also disclosed.

DETAILED DESCRIPTION OF EXEMPLARY EMBODIMENTS

Exemplary embodiments of the present invention are now described in detail. While these embodiments are primarily discussed in the context of a third generation UMTS wireless network (3G), and more specifically in one variant to LTE (3.9G) and fourth generation LTE-A (4G) networks, it will be recognized by those of ordinary skill that the present invention is not so limited. In fact, the various aspects of the invention are useful in any wireless network that can benefit from the configurable segmented public broadcast mechanisms described herein.

As used herein, the term "wireless" means any wireless signal, data, communication, or other interface including without limitation Wi-Fi, Bluetooth, 3G (e.g., 3GPP, 3GPP2, and UMTS), HSDPA/HSUPA, TDMA, CDMA (e.g., IS-95A, WCDMA, etc.), FHSS, DSSS, GSM, PAN/802.15, WiMAX (802.16), 802.20, narrowband/FDMA, OFDM, PCS/DCS, analog cellular, CDPD, satellite systems, millimeter wave or microwave systems, acoustic, and infrared (i.e., IrDA).

Furthermore, as used herein, the term "network" refers generally to any type of data, telecommunications or other network including, without limitation, data networks (including MANs, PANs, WANs, LANs, WLANs, micronets, piconets, internets, and intranets), satellite networks, cellular networks, and telco networks.

Moreover, as used herein, the terms "segmented public broadcast information", "segmented publicly broadcast", "segmented pilot channel", and "Cognitive Pilot Channels (CPC)" refer to any type of transmission which is received by one or more generalized user groups in a wireless communication network or parts thereof. Such generalized user groups may include user class, subscription type, location, etc. Segmented public broadcasts may not be of interest to all users, yet they may be useful for any user. Accordingly, such segmented public broadcasts are not "addressed" to any specific user(s). The following examples are helpfully provided to further clarify publicly broadcast information.

Segmented public broadcast information may be segmented by user class, e.g. by subscriber status. For example, one such exemplary scheme would designate "gold" and "silver" users, each of which is allowed different services. Accordingly, information transmitted for "gold" users, may not be received by "silver" users, and vice versa.

Segmented public broadcast information may require subscription for reception. For example, a third party service provider (i.e., different from the mobile network operator) may provide supplemental service, and a corresponding CPC service. Wi-Fi™ hotspots are one common example of such third party service providers. Users interested in receiving the supplemental services may also choose to receive the corresponding CPC service. Uninterested users may simply ignore the CPC service.

Segmented public broadcast information may be localized, or geographically limited in use. For example, a hospital may force UEs to reduce their output power. Similarly, segmented public broadcast information may be useful only in certain directions, or at cell boundaries (e.g., to facilitate handoff).

Various other aspects of segmented public broadcasts, segments of context information, and their respective uses, etc. will be apparent to those skilled in the arts, given the present disclosure.

Exemplary Cellular Network Architecture—

In the following discussion, a cellular radio system is described that includes a network of radio cells each served by a transmitting station, known as a cell site or base station (BS). The radio network provides wireless communications service for a plurality of user equipment (UE) transceivers. The network of BSs working in collaboration allows for wireless service which is greater than the radio coverage provided by a single serving BS. The individual BSs are connected by another network (in many cases a wired network), which includes additional controllers for resource management and in some cases access to other network systems (such as the Internet or MANs).

In a UMTS system, a base station is commonly referred to as a "NodeB". The UMTS Terrestrial Radio Access Network (UTRAN) is the collective body of NodeBs along with the UMTS Radio Network Controllers (RNC). The user interfaces to the UTRAN via a UE, which in many typical usage cases is a cellular phone or smartphone. However, as used herein, the terms "UE", "client device", and "end user device" may include, but are not limited to, cellular telephones, smartphones (such as for example an iPhone™), personal computers (PCs), such as for example an iMac™, Mac Pro™, Mac Mini™ or MacBook™, and minicomputers, whether desktop, laptop, or otherwise, as well as mobile devices such as handheld computers, PDAs, personal media devices (PMDs), such as for example an iPod™, or any combinations of the foregoing.

LTE networks are based on their UMTS predecessors and referred to as 3.9G networks. FIG. 1 illustrates an exemplary LTE cellular system 100, with a focus on the radio access network (RAN). The RAN includes three (3) Radio Access Technologies (RATs). Each RAT has significant differences in operation. A first UE 110 is shown, operating within the coverage of all three networks.

The system 100 includes one or more base station towers 102 (also known as enhanced-NodeBs (eNBs)), that are set at various fixed geographic locations. Such eNBs may also be generally referred to as a "macrocell". Furthermore, LTE standards have provisioned for the operation of a new network entity, the Home enhanced-NodeB (HeNB) 104, which is a miniaturized version of an eNB. The HeNB is also commonly referred to as a "femtocell"; a femtocell provides similar functionality to a macrocell, but at a reduced capability and cost, and may be portable versus fixed. Femtocells may be purchased by a customer for personal use. The combination of eNBs and HeNBs provide a seamless cohesive service from a network operator. The network operator manages network operation via a Core Network 106. The unified Core Network provides authentication, accounting, and authorization (AAA) services, and in some cases, access to external networks (e.g. such as IP Multimedia Subsystems (IMS) services as specified by the 3GPP).

Each of the eNBs 102 and HeNBs 104 are directly coupled to the Core Network 106 e.g., via broadband access. Additionally, in some networks the eNBs may coordinate with one another, via secondary access. In the illustrated RAN 100 of FIG. 1, the HeNBs are connected to the Core Network, but are not linked to the other entities of the network (e.g., the eNBs). In other network embodiments, HeNB-eNB connections may be implemented. Unlike the broader coverage of the eNBs, a HeNB is generally focused on improving service to a few subscribers. Accordingly, HeNBs may have settings and limitations which are not applicable for the general population. Such non-standard settings are generally disclosed, at least in part, within the pilot channel public broadcasts. Accordingly, the eNB and the HeNB generally have different pilot channel payloads (e.g., context information).

Furthermore, also shown in FIG. 1 is an out-of-network service, provided by a Wireless Local Area Network (WLAN) ad hoc network 108. Such ad hoc networks are not coupled to any higher entity, and widely vary in services provided, authentication, authorization, etc. Accordingly, the ad hoc network has significantly different pilot channel information from either the eNBs 102 or the HeNBs 104.

Ideally, neighboring base stations having overlapping coverage areas should peacefully coexist, and work to minimize Intra-Cell Interference (ICI). Thus, when a UE enters a region of overlapping service, the UE may select (or be transferred) to the optimal base station (e.g., the base station which minimizes transmit and receive power, or optimizes one or more other parameters). Similarly, in mixed networks (i.e., where multiple networks coexist), the UE should efficiently select from the available resources of the disparate networks. While a UE may maintain links to multiple distinct networks to maximize the overall UE data rates, more commonly the UE will choose (or be triggered to perform a "vertical handover" to) the stronger radio link. Vertical handovers are significantly more complex than typical handovers. A vertical handover generally requires a complete shift from one radio access technology to another. Vertical handovers are also referred to as "Inter-Radio Access Technology (Inter-RAT) Handovers" in 3GPP terminology.

Upon inter-RAT cell re-selection or during vertical handovers from a current network to a "new" network, the UE must obtain the relevant context information for the new network. Typical solutions to this requirement include: the UE identifying the context information itself, the network providing the context information to the UE, or a hybrid combination of the previous two options. In the first solution, for a UE to identify the context information, the UE must scan the radio environment. This is often costly in terms of hardware resources, battery consumption, etc. Alternatively, the second solution requires the network to broadcast the context information "blindly"; the network must provide the entirety of its context information all the time. Understandably, such blind transmissions are often wasted and are generally inefficient.

Cognitive Radio—

Cognitive radio is a term generally used to describe a network or wireless node which intelligently alters its wireless communication to, inter alia, avoid interference. Cognitive radio may actively monitor several factors in the external and internal radio environment (such as radio frequency spectrum, user behavior, network state, etc.).

The computational complexity of much cognitive radio theory has rendered its implementation impractical in the past. However, recent advances in the digital electronics arts have greatly contributed to modern cognitive radio developments. For example, significant research has already been conducted on so-called Cognitive Pilot Channels (CPCs). Accordingly, the incipient standards for advanced radio networks have proposed that a CPC should comprise a context provisioning signal for any legacy and future Radio Access Technologies (including LTE).

To this end, one aspect of the present invention relates to improvements to the proposed Cognitive Pilot Channel (CPC).

In one embodiment of the invention, each UE selectively decodes portions (or segments) of the CPC. When a UE is uninterested in the current CPC, its resources may be allocated for other services (e.g., transmission or reception of data). A population of invention-enabled UE devices can remain quiescent during the majority of CPC transmissions; each UE may individually decode at least parts of the CPC for information of interest. Furthermore, selective decoding of the CPC also enables CPC transmissions which are a subset of the comprehensive CPC context information set.

For example, one illustrative embodiment of an improved CPC rotates through varying portions of the context information for transmission. A first portion of the context information may rarely change (e.g., parameters of cellular networks), while other portions may change quite frequently (e.g. the load level of WLAN systems). Consequently, a UE which is newly acquiring the CPC should decode the entire CPC. However, UEs which have been camping (i.e., in RRC_IDLE state) or operating for some time (i.e., RRC_CONNECTED) on the same cell or in the same geographical area, will have already decoded the "old" context information, and need only to recover the latest updates.

Furthermore, an improved Software Defined Radio (SDR) capable UE device is disclosed. The SDR UE dynamically configures itself to use more/less of its flexibly assigned resources for decoding of the CPC. Consequently, the SDR UE can use its freed resources for decoding of data channels provided by a radio access technology (e.g., 3GPP LTE). A corresponding SDR capable BS device is also described. The SDR BS may dynamically broadcast segments of information of varying priority, where the segmented broadcast information is scheduled or selected for broadcast based on the priority of the information. In this manner, the SDR BS efficiently distributes information to the population of UEs. While the SDR UE and SDR BS are complementary, they can also independently operate with increased efficiency (e.g., a SDR UE may efficiently receive broadcasts from a non-enabled BS, a SDR BS may efficiently utilize pilot channel resources with non-enabled UEs.)

The aforementioned improvements to the Cognitive Pilot Channel (CPC) and Software Defined Radio (SDR) entities are now discussed in greater detail.

Exemplary Cognitive Pilot Channel—

Extant modes of CPC operation are divided into "dedicated" CPCs (CPC), and "virtual" CPCs (V-CPC). A dedicated CPC relies on a dedicated physical channel, or radio resource for the transmission of CPC information. In contrast to dedicated CPCs, a V-CPC encapsulates the CPC content within one or more generic radio resources (i.e., the V-CPC is treated as a data payload). V-CPCs are significantly more flexible than traditional dedicated CPCs, and are network agnostic (i.e., may be used to span different networks). As used herein, the terms "CPC" and "V-CPC" describe implementation specific embodiments, and are interchangeable in functionality.

In one aspect of the present invention, a Cognitive Pilot Channel (CPC) is disclosed which modulates or controls its bandwidth for pilot channel messaging. Improvements to pilot channel operation afforded by the invention are applicable for both CPCs and V-CPCs. For a dedicated CPC, any freed dedicated resources may be used for the transmission/reception of other services (e.g., data), or may be "put to sleep" to reduce power consumption or processing overhead. For a V-CPC, freed bandwidth is typically reclaimed for other data services, but other approaches may be employed as well.

As used herein, the term "context information" includes, but is not limited to, data payloads useful for, inter alia, identifying information pertinent to one or more aspects of the wireless network or subscriber classes. Exemplary embodiments of context information are described in IEEE P1900.4 published on Feb. 27, 2009, and entitled "*IEEE Standard for Architectural Building Blocks Enabling Network-Device Distributed Decision Making for Optimized Radio Resource Usage in Heterogeneous Wireless Access Networks*", herein incorporated by reference in its entirety. The aforementioned publication describes context information including: CWN (Composite Wireless Network), Operator, Operator Profile, Operator Capabilities, Assigned Channel, Assigned Channel Profile, Regulatory Rule, SA Policy, RAN, RAN Profile, RAN Configuration, Base Station, Base Station Capabilities, Base Station Configuration, Base Station Measurements, Cell, Cell Profile, Cell Capabilities, Cell Configuration, Cell Measurements, etc.

It is appreciated that some types of context information change frequently, whereas other types of context information may change rarely, if at all. For example, context information regarding the occupation levels or constituency of a WLAN system may change quite frequently. Some network-specific context information (such as the Mobile Country Code (MCC)) for cellular networks changes infrequently, if at all.

Thus, each segment of context information may have varying levels of importance, and frequencies of change. Accordingly, a CPC frame is disclosed herein which can dynamically vary the transmitted CPC context information segments to accommodate such differences.

Furthermore, such user-context-dependent information may be based on both user and base station relationships. Such types of context information may be cell specific and depend on the direction a UE is likely to move to. A UE may require knowledge that it is moving in a certain direction relative to the base station, that the UE is within a certain distance of the base station, or that the UE located in a specific area (e.g., a hospital), etc. Useful context information may include direction dependent information, such as indications of nearby RATs, cells, channels, spectrum restrictions, etc. For example, the user-context-dependent segments of information broadcast in the current cell may comprise segments of information pertaining to the radio landscape of neighbor cells. In this directional embodiment, there may be segments for, inter alia, northwest, north, northeast, east, southeast, south, southwest, and west. A UE which is moving south of a base station may desire corresponding details about the radio landscape south of the base station, or its current position.

Such directional context information is not needed for other UEs that are moving in other directions or remaining relatively stable and may be ignored. Similarly, radial distance may be used separately or in combination with direction, to provide user-context-dependent information. For example, a small cell which is completely subsumed by another cell (e.g., a femtocell operating within a macrocell) may provide radial context information to facilitate handover. Such radial context information is not decoded unless the UE is very close to the cell border.

Figure 2:
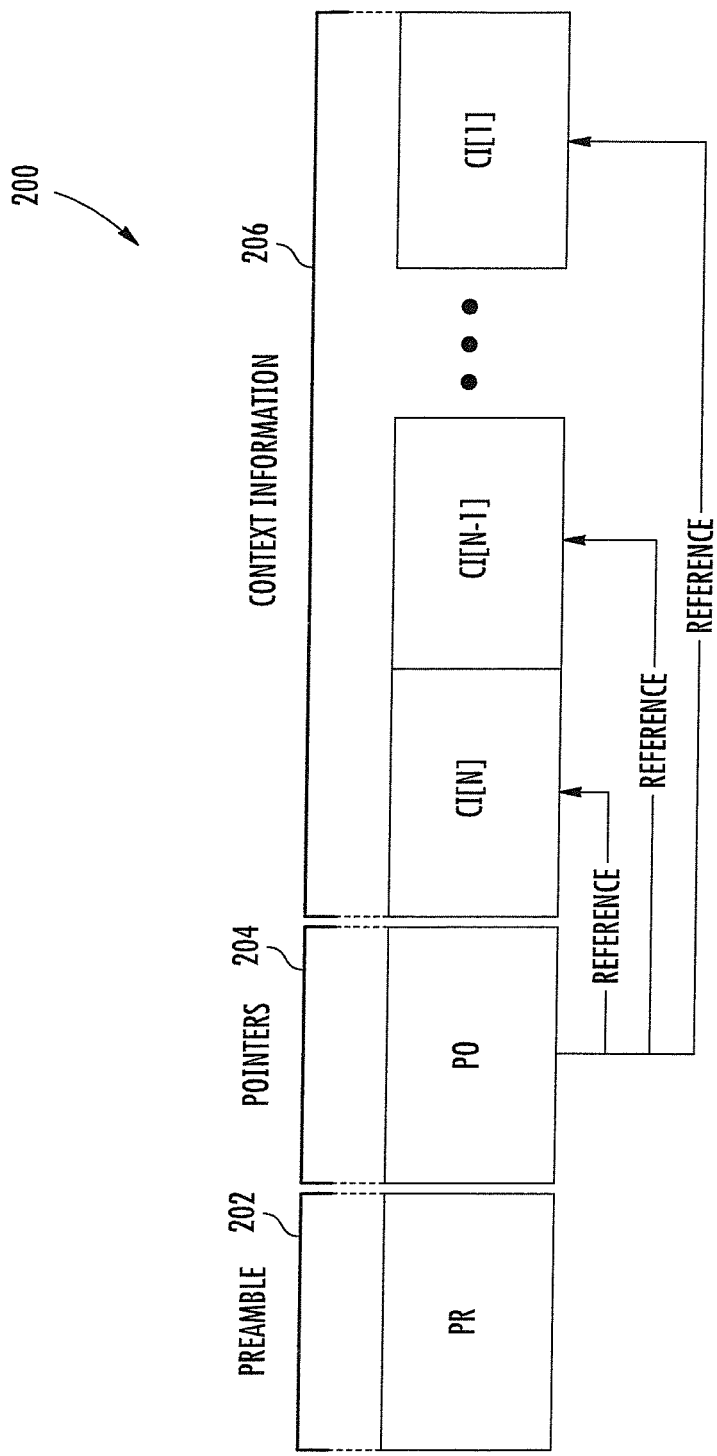
FIG. 2 is a graphical representation of one exemplary embodiment of a Cognitive Pilot Channel (CPC) Frame and its constituent subcomponents or "segments", in accordance with the present invention.

Referring now to FIG. 2, a first exemplary embodiment of a CPC frame 200 is shown depicting three (3) exemplary components: a preamble 202, one or more pointers 204, a plurality of context information 206.

In the exemplary embodiment of the first CPC frame 200, a series of pointers 204 are provided for a UE to identify the appropriate context information 206 of interest. In one implementation, each pointer 204 provides an index which references a distinct location. For example, in one embodiment, the index may be based on an age level. Such age levels may comprise in one embodiment the enumerated values: "new", "recent", "old", and "very old", although other values may be substituted if desired. Other indexes are readily apparent to those skilled in the art, and may include gradations based on importance (e.g. "important", "not important", etc.), types of service (e.g. "etc", "umts", "gprs", "wlan", "wimax", etc.), types useful for business methods (e.g., "gold", "silver", "vip", etc.), etc. Moreover, while the foregoing instances of indexes are generally "qualitative" or enumerated value variables, it will be appreciated that deterministic or numeric variables or systems may be applied (e.g., according to a linear numeric scale, etc.)

Figure 2A:
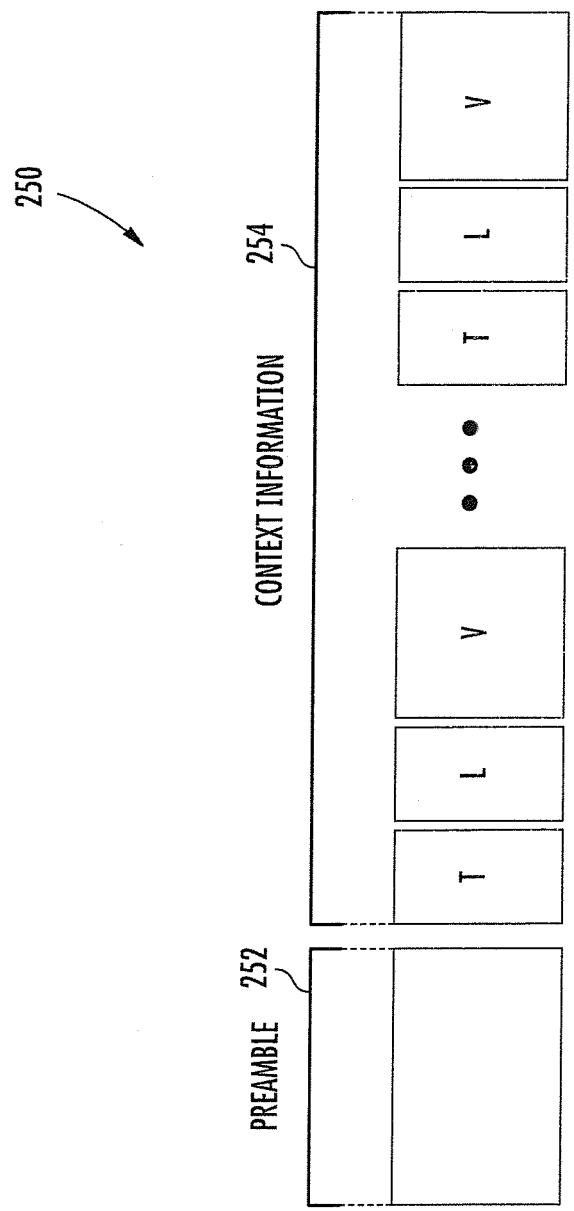
FIG. 2A is a graphical representation of one alternate exemplary embodiment of a Cognitive Pilot Channel (CPC) Frame and its constituent Tag Length Value (TLV) components, in accordance with the present invention.

Alternatively, referring to FIG. 2A, a second exemplary embodiment of a CPC frame 250 is shown depicting two (2) exemplary components: a preamble 252, and one or more Tag Length Value (TLV) objects 254. Each TLV object includes: a binary token or name of the segment (tag), a length indication of the segment (length), and a payload (value). Furthermore, each of the TLV objects may comprise a number of hierarchically structured smaller TLV objects (i.e., the TLV may be a "nested" data structure).

Similar to the pointer scheme, the tags are used to distinctly identify the TLV content. For example, a tag may indicate an age level. Such age levels may comprise in one embodiment the enumerated values: "new", "recent", "old", and "very old", although other values may be substituted if desired. Other tags are readily apparent to those skilled in the art, and may include gradations based on importance (e.g. "important", "not important", etc.), types of service (e.g. "lte", "umts", "gprs", "wlan", "wimax", etc.), types useful for business methods (e.g., "gold", "silver", "vip", etc.), etc. Moreover, while the foregoing instances of tags are generally "qualitative" or enumerated value variables, it will be appreciated that deterministic or numeric variables or systems may be applied (e.g., according to a linear numeric scale, etc.).

The following discussions are provided with respect to the pointer scheme of FIG. 2, other schemes may be readily interchanged (e.g., the TLV scheme of FIG. 2A, etc.). Furthermore, while the following discussions observe a single prioritization method, it is appreciated that multiple dimensions of prioritization may be used. For example, a first UE may be interested in a first prioritization (e.g., "new", "old"), whereas a second UE may be interested in a different prioritization (e.g., "lte" only, or "west" only). Furthermore, a UE may combine multiple prioritizations, for example, a third UE may be interested in "new", "umts" information in the "south". As will be described in greater detail hereinafter, such combinations may be represented as early as preamble detection, and may require active modification to preamble detection schemes.

The exemplary CPC frame 200 of FIG. 2 uses pointers 204 to improve access to context information 206; however, other forms of indicia may be used in other implementations. For example, the aforementioned alternative TLV-parsing scheme could parse the entire CPC and decode only the TLVs which are of interest. In one such embodiment, the UE can decode each of the TLVs, deriving a tag and length value. Based on the tag value, the UE can determine if the TLV is of interest. For example, if the UE is moving west and interested in directional updates, then the UE searches for tag values which are "west". If the information is not desired, then the UE may jump over undesired information blocks (i.e., skipping the number of bits or bytes indicated by the length field of the undesired context information). A length of zero (0) would indicate no value component. Similarly, some TLV entries may simply comprise a tag (i.e. no length or value), where the mere presence of the tag itself is (or is not) of interest to the UE.

Furthermore, some embodiments may utilize hybrid combinations for efficient decoding of CPC frames. For instance, in one such hybridized embodiment, at the upper hierarchy level a pointer is provided for each segment, while subsequent hierarchy levels use nested TLV objects.

The preamble 202 is a readily recognizable signal useful for identifying the start of a public broadcast in a transmission channel. In one embodiment, the preamble includes a recognizable short indicator located at the beginning of the CPC transmission. In other embodiments, the preamble may be located in the middle of the transmission (e.g., as used in GSM, a midamble), or even at the end of the transmission. The preamble may also be issued at multiple times/locations. As shown, the preamble of the illustrated embodiment includes a first portion of the CPC transmission. However, it is appreciated that in other embodiments, the preamble may also be a message entirely separate from the payload (i.e., pointers and/or context information).

The exemplary CPC frame 200 of FIG. 2 and its prioritization of context information 206 enable a wide variety of schemes for CPC transmissions, some examples of which are described in greater detail below.

Shifting Context Information—

Figure 3:
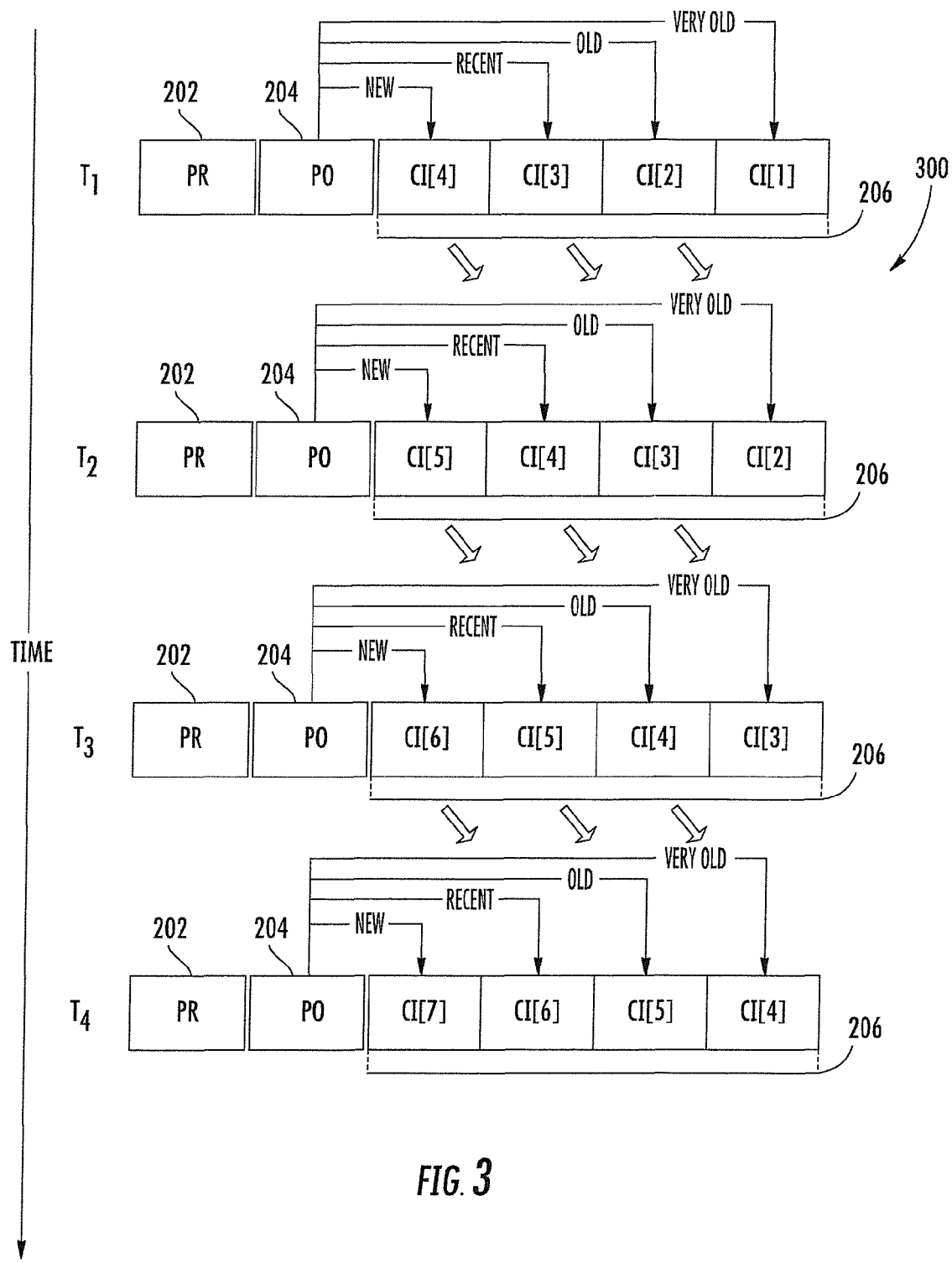
FIG. 3 is a graphical representation of one embodiment of a first sequence of transmissions of the exemplary CPC Frame of FIG. 2, where each subsequent transmission illustrates a "rotation" or "shifting" of one or more of the segments of context information.

Referring now to FIG. 3, a shifting or rotating scheme 300 is presented for modifying the context information of a CPC frame. At time $T_1$, a first CPC frame 200 is transmitted. The frame includes three (3) exemplary components: (i) a preamble 202, (ii) one or more pointers 204, and (iii) four (4) segments of context information 206. The context information is further categorized in age levels, and has pointers for "new", "recent", "old", and "very old" as previously described. The series of pointers provides starting locations for each of the context information entries.

At the next subsequent time $T_2$, the age levels of the context information of the first CPC frame 200 are updated. Accordingly, "new" context information has the "new" pointer, whereas the previously "new" context information is now referenced with the "recent" pointer, etc. Subsequent times $T_3$ and $T_4$ are also illustrated for clarity. Implementation of such "sliding windows" is readily performed by those of ordinary skill given the present disclosure, such as via shift registers, circular buffers, etc.

Time Varying CPC Frame Length—

Figure 4:
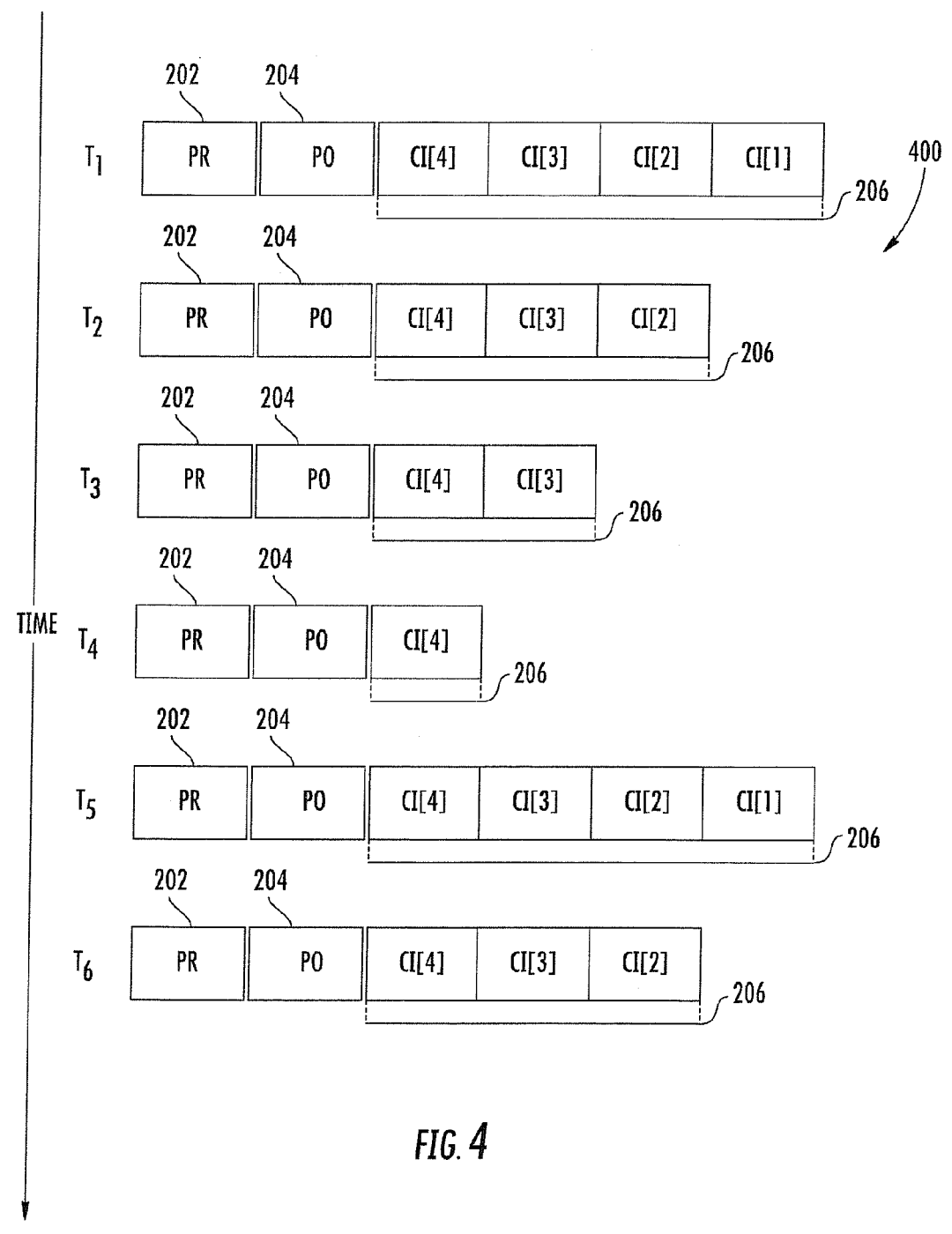

Referring now to FIG. 4, a first exemplary time-varying scheme 400 is presented for modifying the CPC frame length. At time $T_1$, a first CPC frame 200 is transmitted. At the second transmission $T_2$, the context information of the first CPC frame is decremented. The context information CI[1] is not transmitted. The third transmission ($T_3$) is decremented again (i.e., both CI[2], and CI[1] are excluded). Subsequent frame transmissions $T_4$, $T_5$, and $T_6$ are shown for completeness.

Figure 4A:
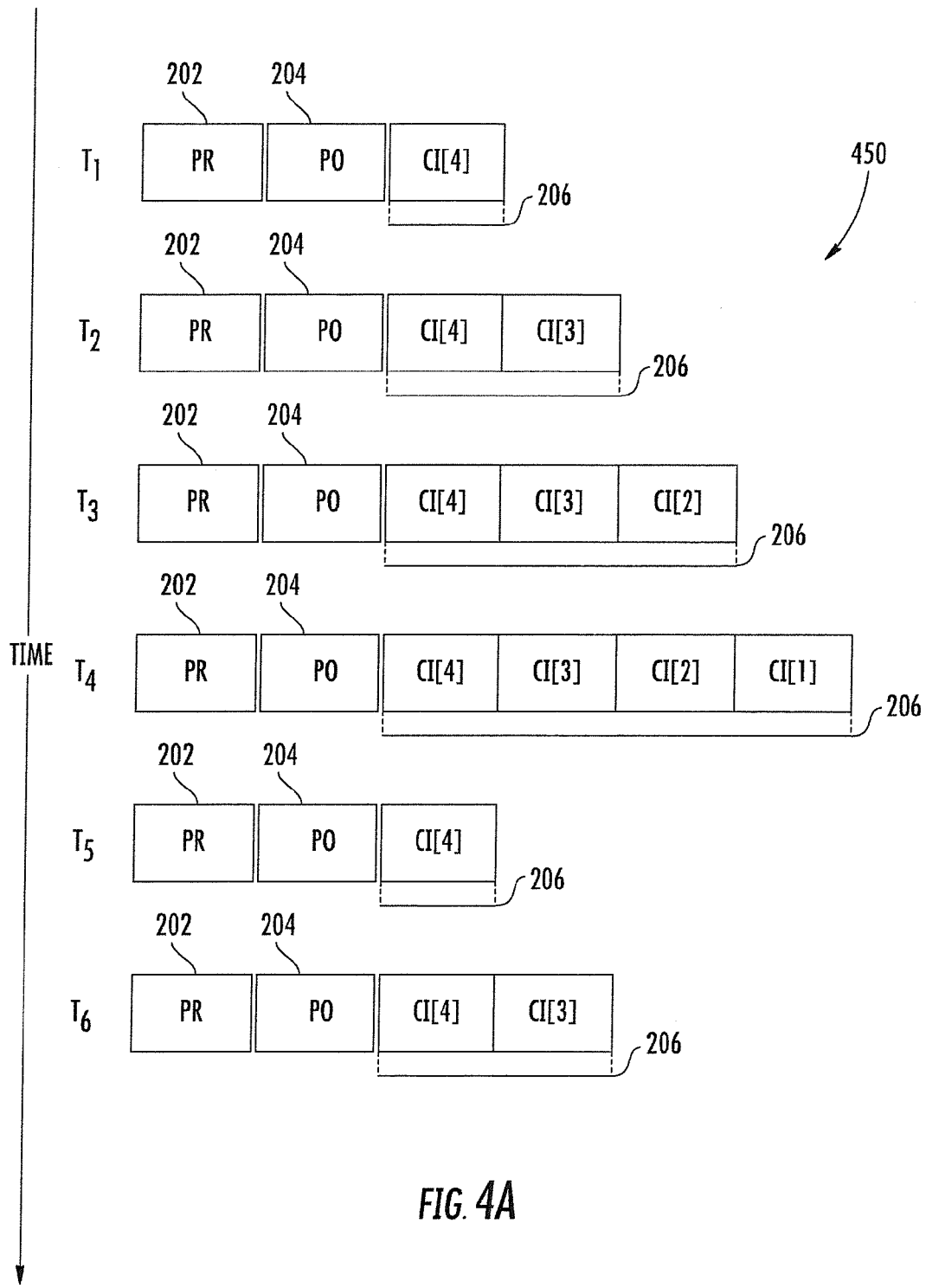
FIG. 4A is a graphical representation of another embodiment of a second sequence of transmissions of the exemplary CPC Frame of FIG. 2, where each subsequent transmission is incremented according to a first method of the invention.

Similarly, as shown in FIG. 4A, the time-varying scheme 450 for modifying the CPC frame length of FIG. 4 above is modified so as to increment versus decrement. Specifically, at time $T_1$, a first CPC frame 200 is transmitted having a first segment of the entirety of the context information. At the second transmission $T_2$, a second segment of the entirety of the context information of the first CPC frame is added. The third transmission ($T_3$) provides yet more information. Subsequent frame transmissions $T_4$, $T_5$, and $T_6$ are shown for completeness. Such an embodiment may allow a UE to receive any transmission, and receive the contents of the preceding transmissions as well e.g. a UE which receives transmission at time $T_3$, may opt to decode the context information of $T_1$, and $T_2$.

Figure 5:
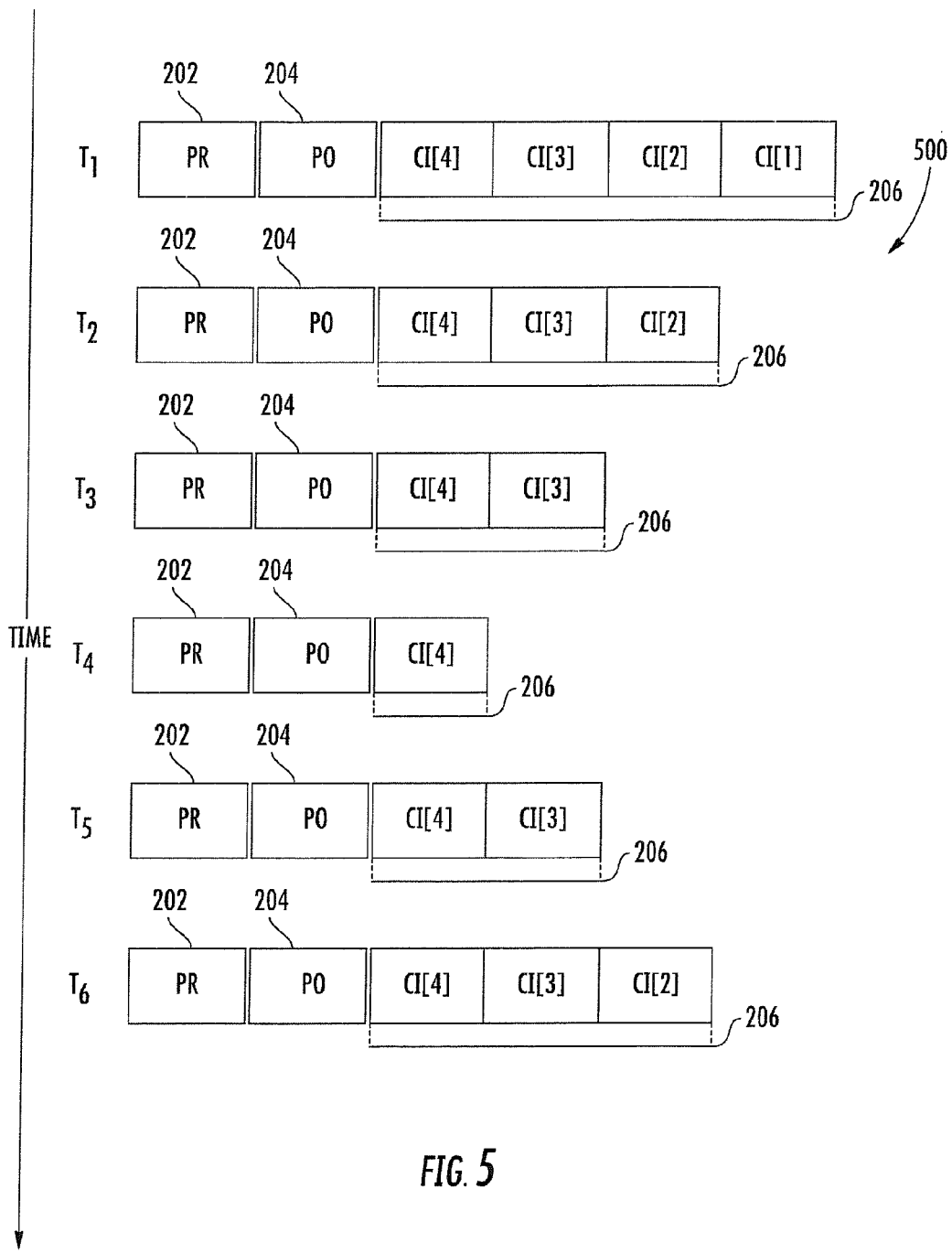
FIG. 5 is a graphical representation of one embodiment of a third sequence of transmissions of the exemplary CPC Frame of FIG. 2, where each subsequent transmission is incremented or decremented according to a second method of the invention.

Referring now to FIG. 5, a second time-varying scheme 500 is presented for modifying the length of a first CPC frame 200.

At time $T_1$, a first CPC frame 200 is transmitted. At the second transmission time $T_2$, the context information of the first CPC frame is decremented. The "very old" context information is not transmitted. The third transmission ($T_3$) is decremented again. However, unlike the first time varying scheme presented in FIG. 4, the second time varying scheme switches from incrementing to decrementing at time $T_6$.

Figure 6:
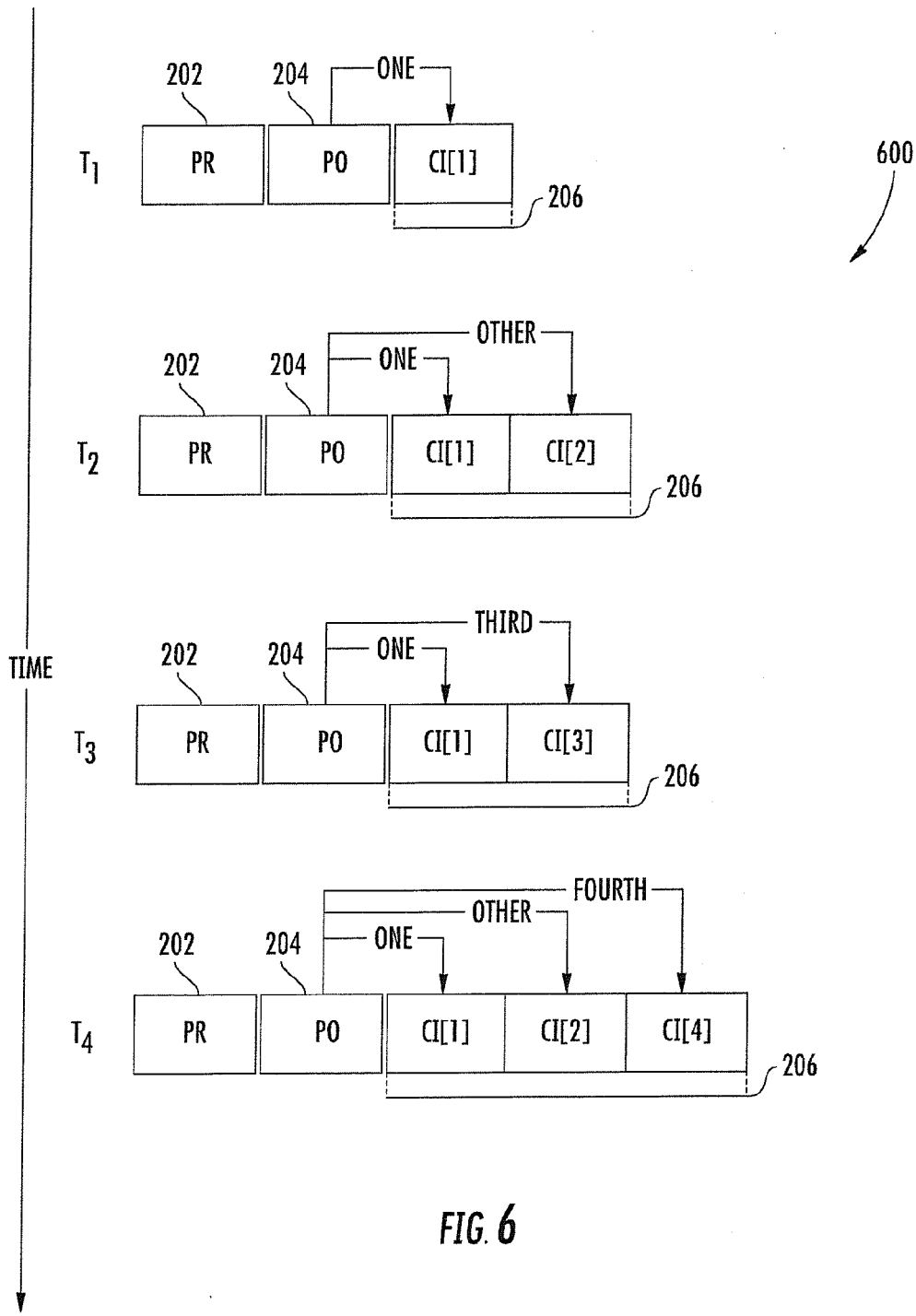
FIG. 6 is a graphical representation of one embodiment of a fourth sequence of transmissions of the exemplary CPC Frame of FIG. 2, where each subsequent transmission provides segments of varying periodicities.

Referring now to FIG. 6, a third embodiment of a time varying scheme 600 is presented for modifying the length of a first CPC frame 200. Unlike the first and second time varying schemes (FIGS. 4 and 5 above), the plurality of context information 206 in the scheme of FIG. 6 is further categorized in periodic frequency, and has pointers for "every one", "every other", "every third", "every fourth", etc. This third scheme provides individually selectable periods for each segment of the context information 206.

At time $T_1$, a first CPC frame is transmitted having only "every one" context information. At the second transmission $T_2$, the "every one" and "every other" context information is sent. At the third transmission only the "every one" and "every third" context information is sent. Additional transmissions are shown for completeness.

It will be appreciated that other periodicities or temporal schemes may be used as well consistent with the invention. For example, complex periodicities such as "every 2n−1" can be used. These periodicities can also be made to vary over time if desired, such as by incrementing the value of "n" in the foregoing example relationship between integer values of i and j.

More generally, the FIGS. 4, 4A, 5, and 6 illustrate the benefits of changing frame composition over time. The context information is provided as a function of newness i.e., the newest information should be available in the maximum number of frames, whereas the oldest information is only periodically transmitted. However, other repetition patterns may be used for other situations. For example, if the frame transmissions are cyclically repeated after "M" frames, then "new" information may be included in any "A" number of frames, "recent" information may be included in any "B" number of frames, "old" information may be included in any "C" number of frames, and "very old" information may be included in any "D" number of frames, where D is less than or equal to C which is less than or equal to B which is less than or equal to A which is less than or equal to M.

Context Information Based Schemes—

Figure 7:
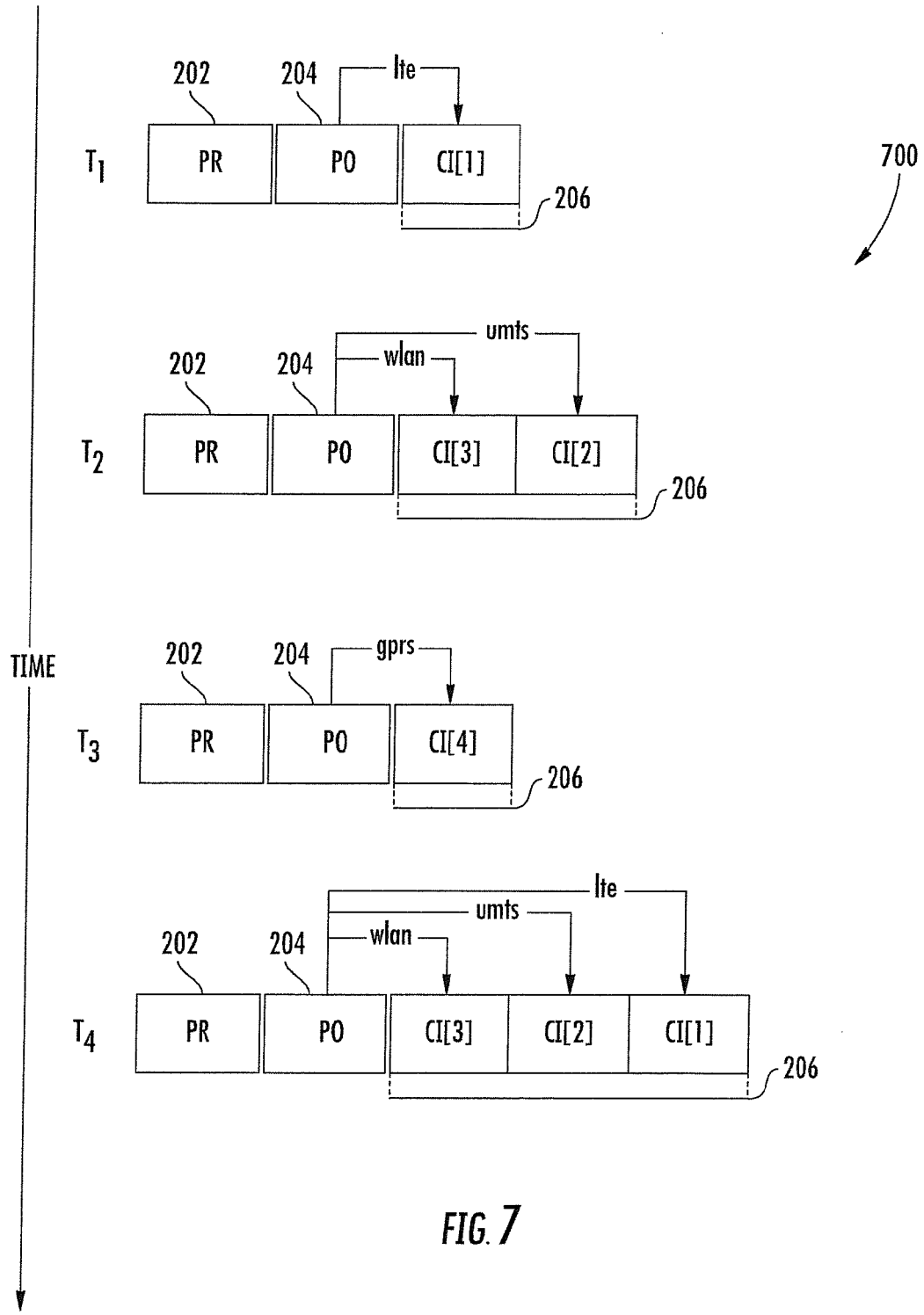
FIG. 7 is a graphical representation of one embodiment of a fifth sequence of transmissions of the exemplary CPC Frame of FIG. 2, where each subsequent transmission provides segments of various applicability.

Referring now to FIG. 7, one embodiment of a context information-based scheme 700 is presented for modifying the length of a first CPC frame 200. The plurality of context information 206 is further categorized by function, and has in this example pointers for "lte", "units", "gprs", "wlan", etc. The context information-based scheme dynamically alters CPC transmissions with the content of the context information 206.

At time $T_1$, a first CPC frame is transmitted having only "LTE-specific" context information. At the second transmission $T_2$, only the "UMTS-specific" and "WLAN-specific" context information is sent. At the third transmission only the "GPRS-specific" context information is sent. Additional transmissions are shown for completeness.

While the aforementioned examples (FIGS. 3, 4, 4A, 5, 6, and 7) are prioritized by a network entity (e.g. an eNB 102, etc.), it is appreciated that the prioritization of context information may be independently determined by each UE, or another entity (e.g., a proxy for the UE or eNB). Consider for example a network based prioritization embodiment where the prioritization of information (e.g., age levels) is solely controlled by the network. The network internally determines if the context information is "new", "recent", etc. In contrast to this network based embodiment, an exemplary UE based prioritization embodiment would use each UE (or at least some UEs in the network) to individually determine the appropriate prioritization of context information for itself. For example, a network base station may not directly indicate the age level of each context information segment, but may instead provide a "first transmission time", where the first transmission time signifies when the information was broadcast for the first time. Each UE may calculate a suitable relative age level for context information based on internal time thresholds for "new", "recent", etc., which may vary from UE to UE (or based on other factors, such as UE remaining battery power). Accordingly, a first and second UE may categorize the same broadcast differently.

Figure 8:
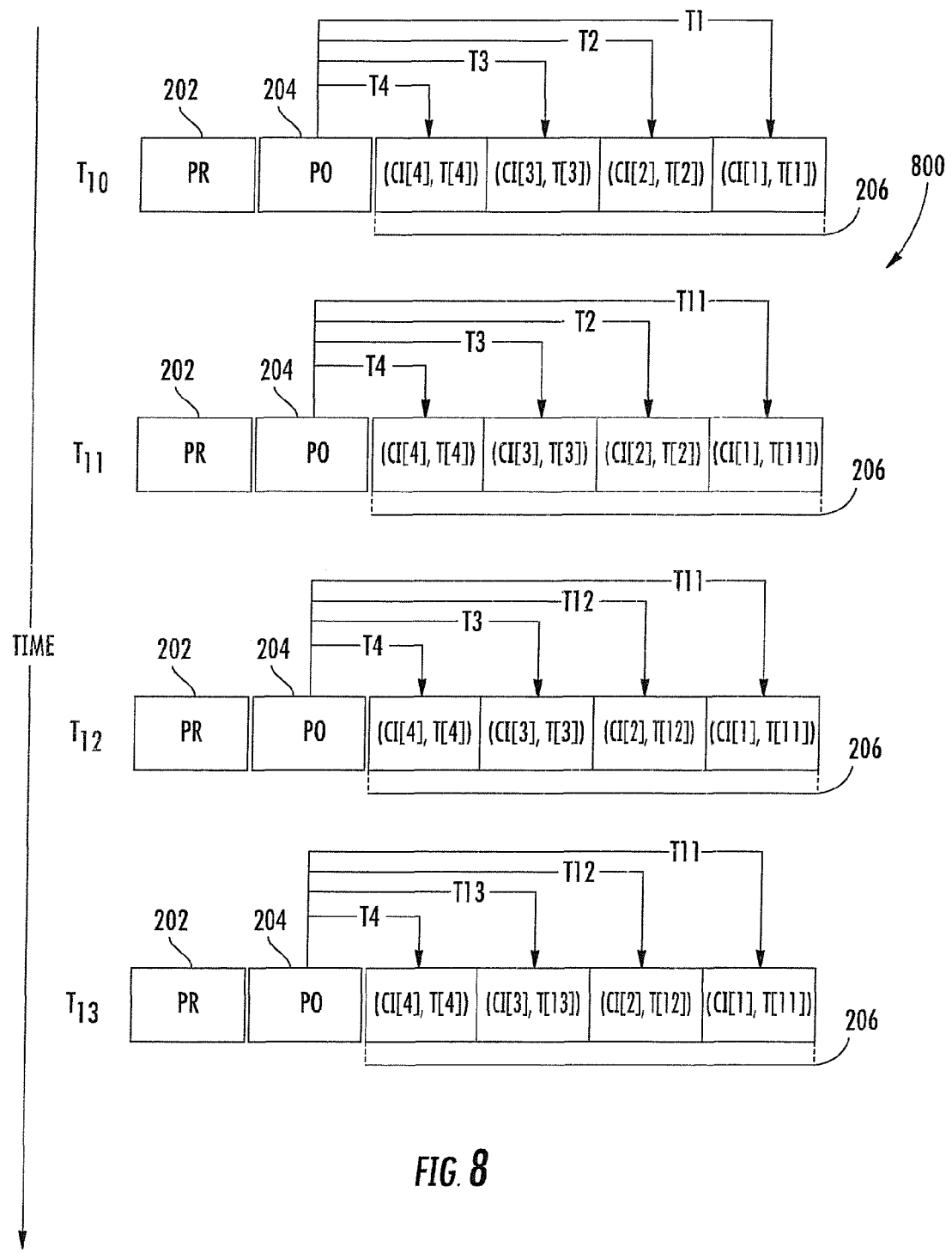
FIG. 8 is a graphical representation of one embodiment of a sixth sequence of transmissions of the exemplary CPC Frame of FIG. 2, where each subsequent transmission provides a time stamp attached to each segment, thereby enabling user equipment (UE) to determine the importance of context info illation, in accordance with the present invention.

FIG. 8 illustrates one embodiment of a CPC frame transmission 800 for use with an age level UE-based scheme. The plurality of context information 206 is augmented with a time stamp for its first transmission time (i.e., a "born at" time). Such pairing is denoted with a (CI[X], T[Y]) where CI[X] is the context information, and T[Y] is a time stamp. As shown, when context information CI[1] is updated at time T11, its corresponding pointer is similarly updated with the value T11 (see (CI[1], T[11]). Likewise, CI[2] is updated at time T12, etc. (see (CI[2], T[12]).

Figure 8A:
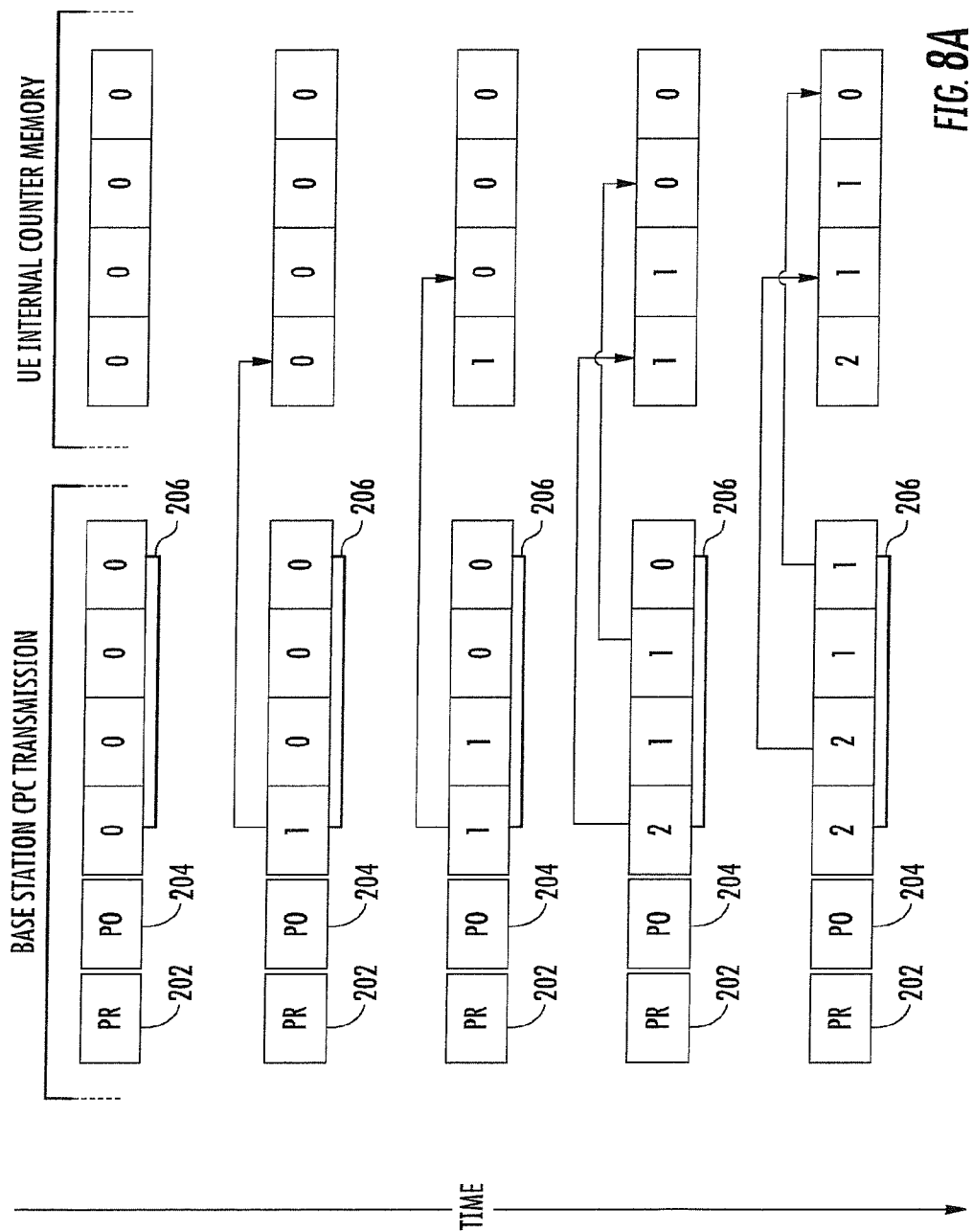
FIG. 8A is logical flow diagram illustrating one embodiment of a hybrid network-based and UE-based age level prioritization process according to the invention.

Various combinations of network-based and UE-based prioritization can also be used. For example, one hybrid age level prioritization scheme may comprise a network assigning a counter to each segment of context information within a CPC frame. When one or more segments are updated, the network base station or other entity increments its corresponding counter. Each UE has an internal memory, which stores the value of its most recent counter value (i.e., the value read during its last update). Responsive to receiving the CPC frame, the UE compares its counter to the network counter value to determine if the CPC transmission is of interest to the UE (See FIG. 8A). Each time the UE updates its context information, the UE increments its appropriate counter. The UE compares its counter to the network counter to determine if the context information is of interest.

In another such UE-based scheme, a BS may provide CPC transmissions for "northwest", "north", "northeast", "east", "southeast", "south", "southwest", and "west". Each UE may internally determine their location with respect to the BS via location determination (such as via a Global Positioning System (GPS) signal or via a location determination network such as the one described in the Assignee's co-pending U.S. patent application Ser. No. 12/286,646 entitled "METHODS AND APPARATUS FOR RESOLVING WIRELESS SIGNAL COMPONENTS" filed Sep. 30, 2008, and incorporated herein by reference in its entirety), and decode the appropriate context information accordingly. For example, by determining that the UE is south of the BS, the UE may opt to decode the "south" CPC transmission. Similarly, radial distances may be used. For example, if the UE is near the "edge" of the cell coverage, and it may decode an "edge" CPC transmission.

It will be recognized that each of the foregoing specific examples of various CPC frames are only illustrative of the broader possibilities for dynamically updating the context information of CPC frames. Each of the schemes may be modified as required for other implementations. In fact, several of the schemes may be readily intermixed, combined or interchanged, as can be appreciated by those skilled in the arts given the present disclosure.

Exemplary SDR User Equipment (UE) Apparatus—

In accordance with the configurability of the CPC frames 200 previously described, a Software Defined Radio (SDR) UE apparatus is also disclosed herein. The SDR UE may selectively decode the CPC based on device, usage, and/or network considerations. For example, if an SDR UE requires information that is recent, then it may adjust its radio operation to receive an abbreviated update CPC frame at the earliest possible time (e.g., initial frame acquisition). Alternatively, if the SDR UE requires the entirety of the CPC frame, then it may wait until such a comprehensive frame is transmitted. In general, SDR UEs which are new to a radio access network (RAN) require comprehensive sets of context information, whereas UEs which have been connected for some time in the RAN only need periodic updates.

Figure 9:
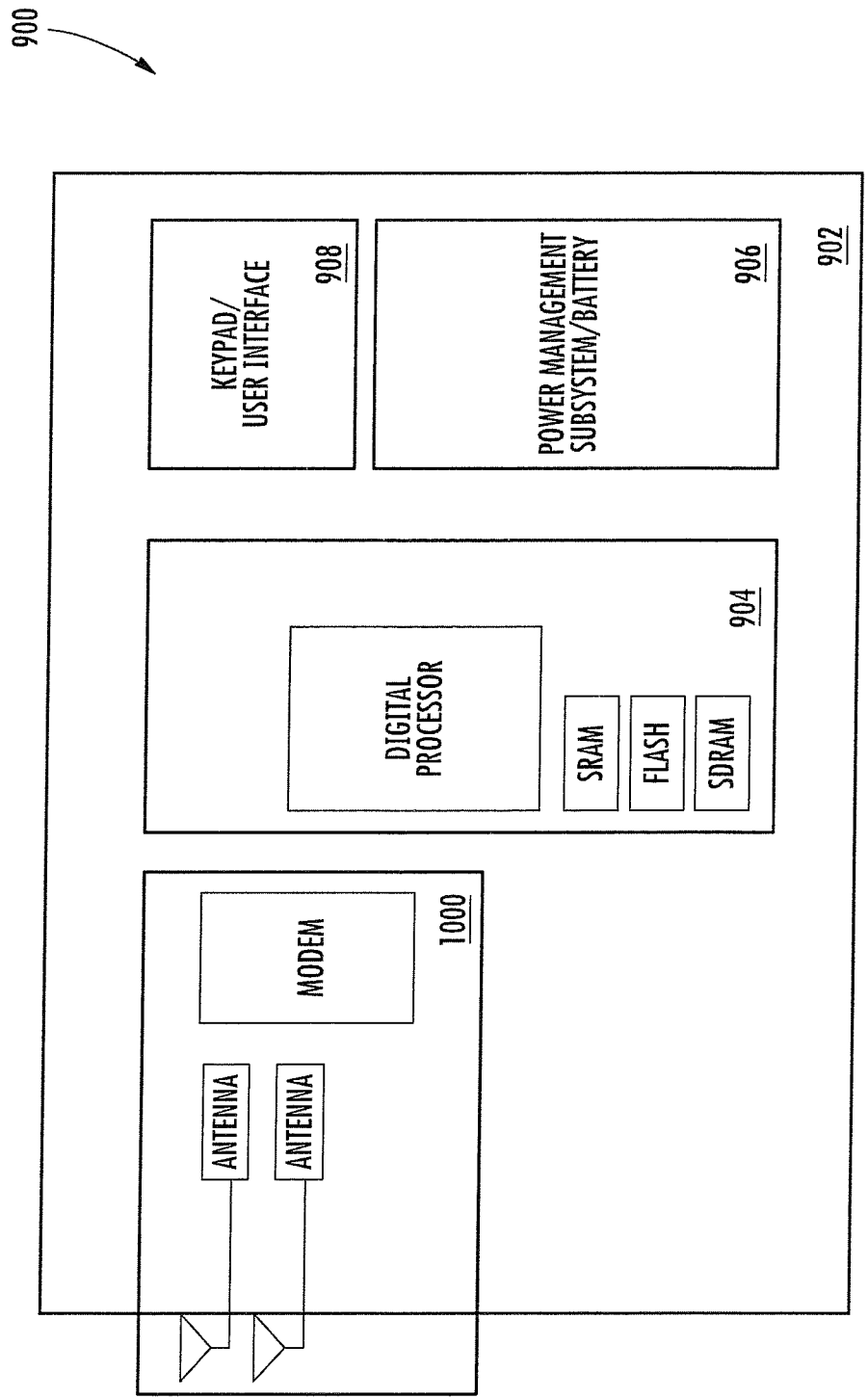
FIG. 9 is a functional block diagram illustrating one embodiment of a software defined radio (SDR) apparatus adapted to implement the methods of the present invention.

Referring now to FIG. 9, one exemplary client or UE apparatus 900 useful in implementing the methods of the present invention are illustrated. The apparatus disclosed comprises, inter cilia, a UE such as a smartphone, portable computer, or mobile communications device capable of dynamic pilot channel reception. The configuration of pilot channel reception is preferably performed in software, although hardware/firmware embodiments are also envisioned.

The exemplary UE apparatus includes one or more substrate(s) 902 that further include a plurality of integrated circuits including a processing subsystem 904 such as a digital signal processor (DSP), microprocessor, programmable logic device (PLD), gate array, or plurality of processing components as well as a power management subsystem 906 that provides power to the UE 900, a user interface (UI) subsystem 908, and a SDR subsystem 1000. As used herein, the term "integrated circuit (IC)" refers to any type of device having any level of integration (including without limitation ULSI, VLSI, and LSI) and irrespective of process or base materials (including, without limitation Si, SiGe, CMOS and GaAs).

The processing subsystem may also comprise an internal cache memory. The processing subsystem 904 is connected to a memory subsystem comprising memory which may for example, comprise SRAM, Flash and SDRAM components. The memory subsystem may implement one or a more of DMA type hardware, so as to facilitate data accesses as is well known in the art.

The illustrated power management subsystem (PMS) 906 provides power to the UE, and may include an integrated circuit and or a plurality of discrete electrical components. In one exemplary portable UE apparatus, the power management subsystem 906 interfaces with a rechargeable battery power source within the UE.

The user interface subsystem 908 includes any number of well-known I/O including, without limitation: a keypad, touch screen (e.g., multi-touch interface), LCD display, backlight, speaker, and/or microphone. However, it is recognized that in certain applications, one or more of these components may be obviated. For example, PCMCIA card type UE embodiments may lack a user interface (as they could piggyback onto the user interface of the host device to which they are physically and/or electrically coupled).

The apparatus 900 may further include optional additional peripherals including, without limitation, one or more GPS transceivers, or network interfaces such as IrDA ports, Bluetooth transceivers, USB, FireWire™, WiMAX transceivers, etc. It is however appreciated that these components are not required for operation of the UE in accordance with the principles of the present invention.

Figure 10:
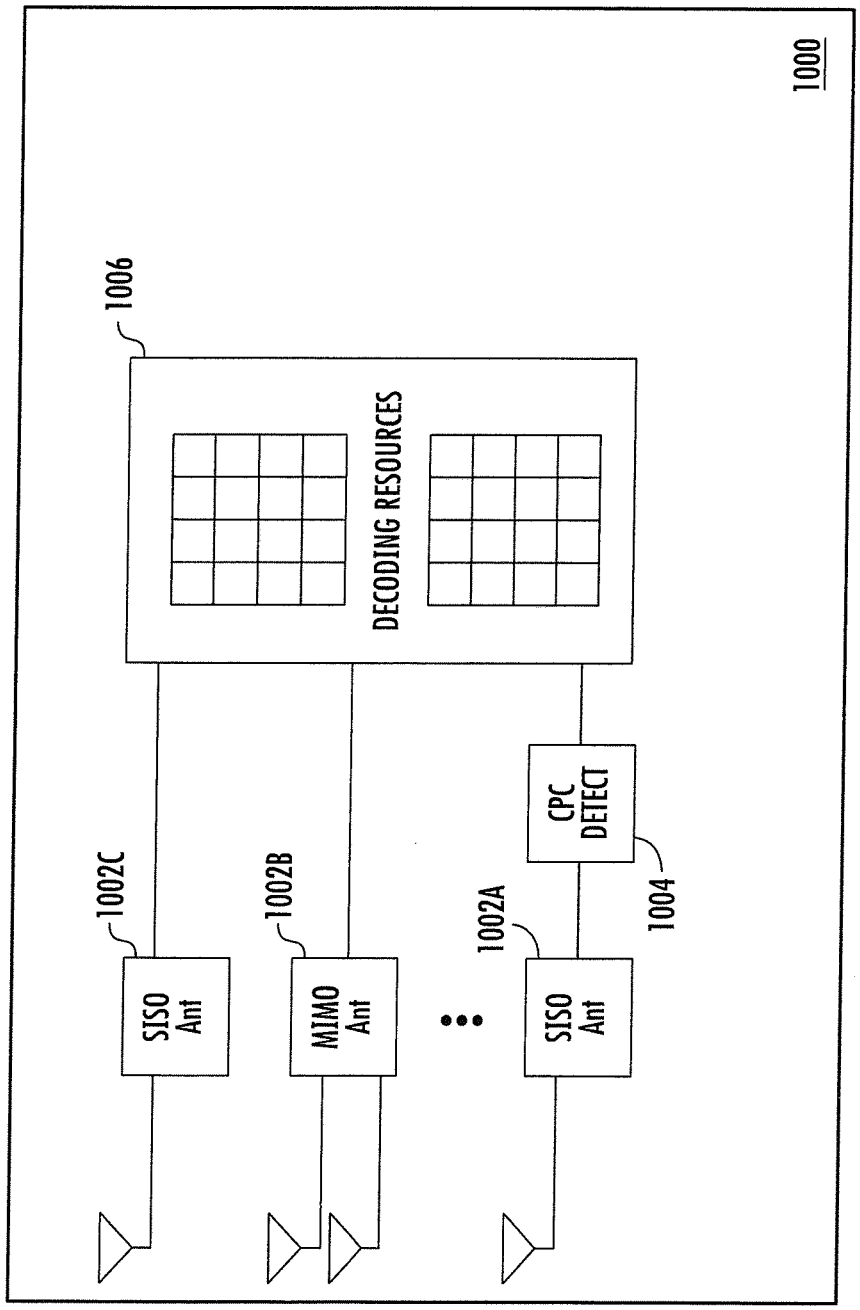
FIG. 10 is a functional block diagram further illustrating one embodiment of a Software Defined Radio (SDR) subsystem of the SDR apparatus of FIG. 10.

FIG. 10 illustrates one embodiment of the radio/modem subsystem 1000 in greater detail, including SDR subsystem architecture. The SDR subsystem includes three (3) distinct components: one or more RF front-ends 1002, a CPC preamble detector 1004, and a plurality of decoding resources 1006. In the illustrated example, the CPC preamble detector is operatively coupled to a first RF front-end 1002A and the plurality of decoding resources. The remaining RF front-ends (1002B, 1002C) are coupled directly to the plurality of decoding resources. In other embodiments, the CPC preamble detector may be flexibly coupled to any one or more of the RF front-ends. Each of these components is now discussed in greater detail.

The RF front-end 1002 of the illustrated embodiment generally includes the antenna and any analog stages used to convert a received radio signal to a digital signal. An RF front-end may include a wide variety of filters, amplifiers, analog-to-digital converters (A/D), digital-to-analog (D/A) converters (including e.g., direct or delta-sigma converters), mixers, multiplexers, duplexers, diplexers, etc. Due to the very specific nature of RF reception, RF front-ends are generally adapted to a very limited range of operation.

In some instances, multiple RF front-ends may be required for different radio frequencies, and or radio access technologies (RATs). For example, in the illustrated embodiment, the SDR UE has three (3) different RF front-ends: a first RF front-end dedicated to the reception of the dedicated CPC channel 1002A, and multiple (2) second RF front-ends (1002B, 1002C) adapted to reception of other RATs. The second RF front-ends include one MIMO (Multiple Input Multiple Output) front-end, and one SISO (Single Input Single Output) front-end, although other configurations may be used as well. It is readily appreciated that in some embodiments, the RF front-ends may support any combination of MIMO, SIMO, MISO, and SISO antennas.

Furthermore, while the first RF front-end is a SISO antenna dedicated for receiving CPC preambles, it is appreciated that the first RF front-end could be selected from any of the possible antenna combinations (MIMO, SIMO, MISO, SISO, etc.). In fact, in an alternate embodiment, the CPC detector 1004 may be freely coupled to any of the generic front-end resources.

The CPC preamble detector 1004 is a component which is specifically adapted to detect the CPC. In one exemplary embodiment, the CPC preamble detector is a correlating device which detects the presence of the aforementioned CPC preamble 202. The preamble detector may operate either in the digital domain or analog domain (e.g., a matched filter).

In the illustrated embodiment, the CPC preamble detector 1004 is a distinct entity from the decoding resources 1006, and the RF front-ends 1002. Such an embodiment is particularly useful within the context of the present invention in that preamble detection does not consume any decoding or antenna resources to operate. In other embodiments, the preamble detector may be subsumed within either of the other entities, so as to achieve other goals or form factors including, inter alia, minimized die space, minimized power consumption, etc.

Figure 11:
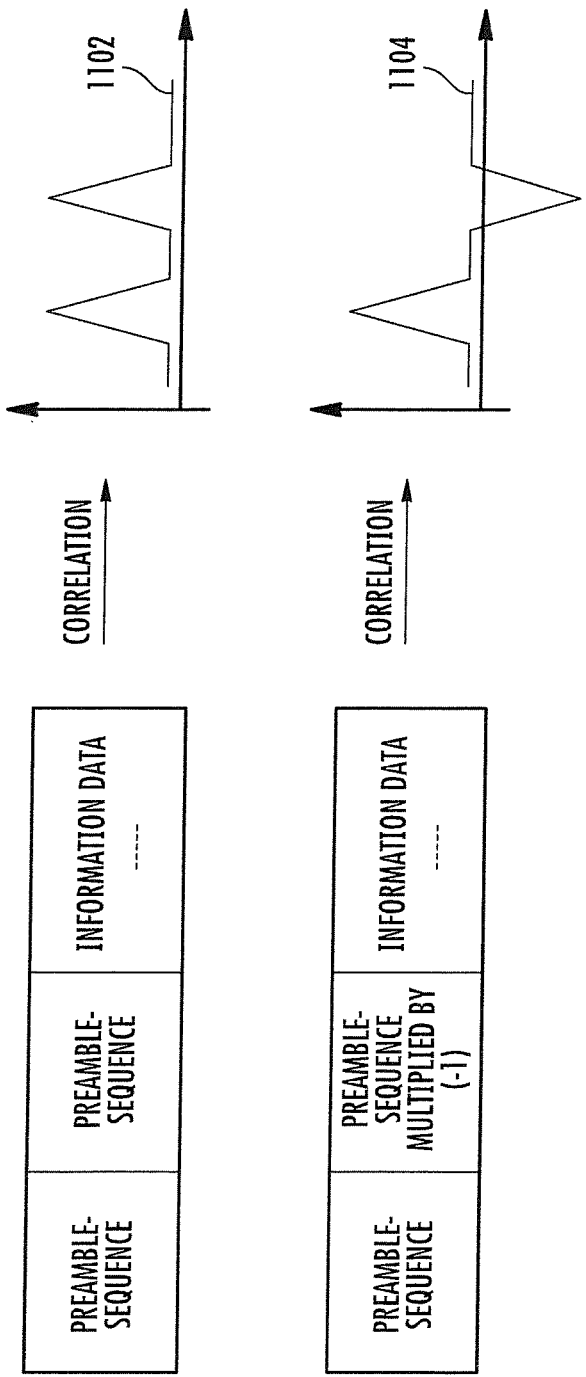
FIG. 11 is a graphical representation of one embodiment of a preamble weighting and correlation sequence used to uniquely weight each transmitted preamble according to the invention.

Furthermore, in some embodiments, the preamble detector 1004 may be configured to give an initial "signature" for a received CPC frame. For example, FIG. 11 illustrates one technique of how a preamble sequence can be multiplied with a scaling factor so as to impart additional information at the CPC preamble detector. In the first transmission sequence 1102, the preamble is transmitted twice "in phase". In the second transmission 1104, the preamble is transmitted once, and inverted (i.e., out of phase) for the following transmission, such as by multiplication by −1. The CPC preamble detector can thus distinguish between the first and second transmission, on the basis of the correlation results (i.e., represented as [1, 1] and [1, −1]). Correlation sequences may have more complex weights than +1/−1 (i.e. BPSK) values, for example, a rotated QPSK (+1/−1/+j/−j) could be used, for higher order QAM constellations. Furthermore, correlation sequences may use different timing offsets to convey different information, or portions of information. For example, so-called pulse-position modulation encodes information in the distance between two correlation peaks, and is used in Ultra-Wideband systems. Other differentiation schemes may be used as well, the foregoing being merely illustrative.

Figure 11A:
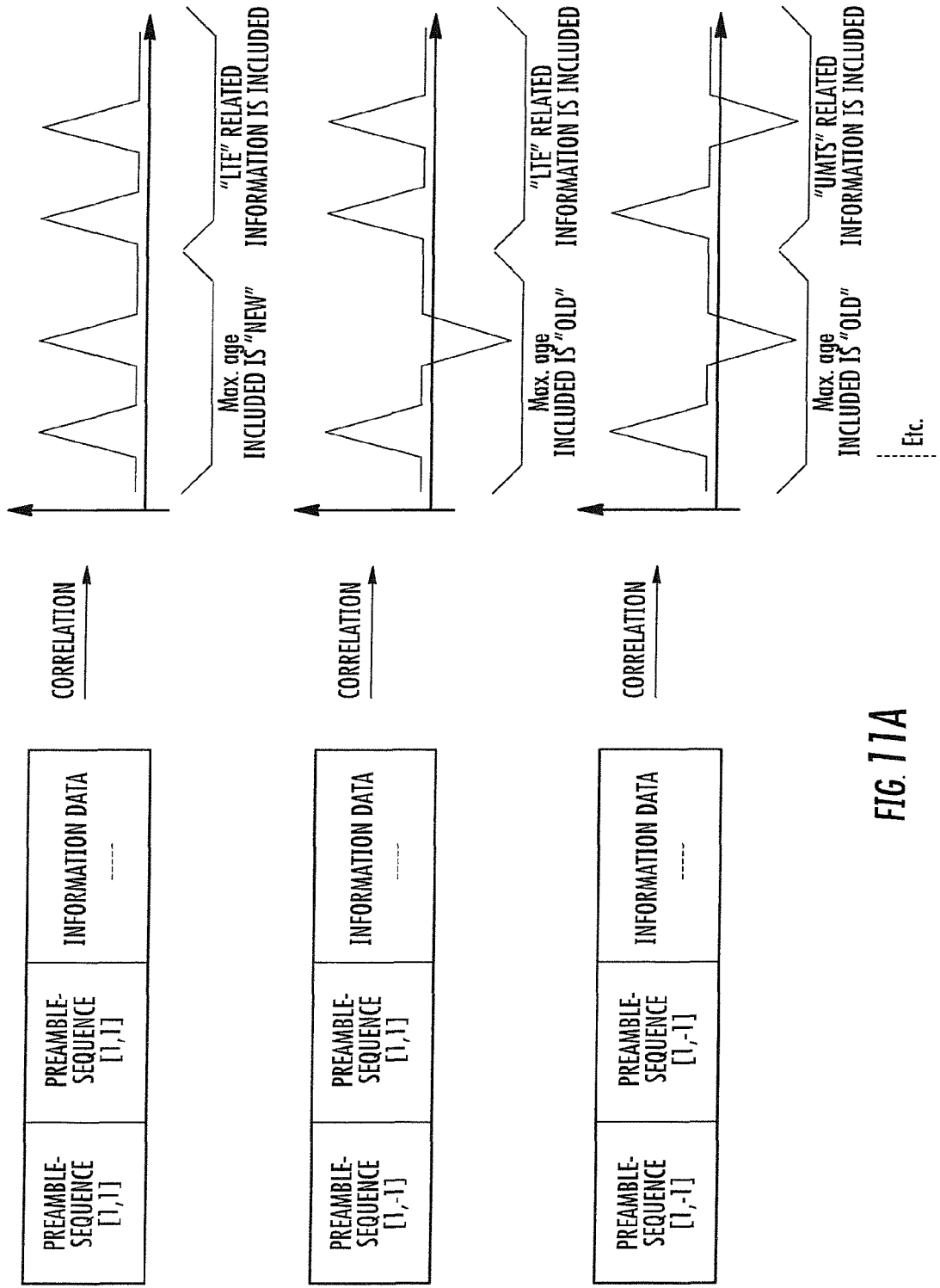
FIG. 11A is a graphical representation of several exemplary preamble weightings, correlation sequences, and context information "hints" according to the invention.

FIG. 11A illustrates three exemplary preamble sequences, and possible resultant interpretations. For simplicity, the preamble sequence is separated into a first "age" having two possibilities ("new"=[1, 1], "old"=[1, −1]), and a second "function" having two possibilities ("lte"=[1, 1], "umts" [1, −1]). The receiver correlates for the preamble, and based on the correlation result, can determine the contents of the context information.

Such differentiation may be useful for quickly identifying if the UE is interested in the context information of the CPC transmission during initial frame acquisition. For example, in one exemplary embodiment, a base station may signify a change to CPC frame data by weighting the preamble indicia. Such a change stamp can be as simple as switching between two orthogonal preambles for each information update (e.g., if there are no updates to the CPC frame, then the weighting is kept the same). In another exemplary embodiment, different preamble sequences may be used to signify various priority levels (e.g., age levels, applicable functionality, etc.), or encode yet other variables of interest to the UEs. It is appreciated that such additional complexity to preamble detection may reduce unnecessary CPC decoding (and hence further optimizing power consumption and/or overhead processing), at the cost of increasing CPC preamble detector complexity. Moreover, such enhanced preamble decoding capability can be selectively employed within the UE, such as where it is switched on and utilized only where the RAN with which the UE is currently associated is capable of such transmissions.

Referring back to FIG. 10, the plurality of decoding resources 1006 of the illustrated embodiment includes apparatus adapted to decode received data. Generally, decoding resources may include such elements as processing elements, application specific circuitry, and or other common communication elements, such as Fast Fourier Transforms (FFT) processing, Multiply Accumulate (MAC) logic, arithmetic logic units (ALU), floating point logic, etc. In one LTE RAT specific embodiment, the decoding resources are configurable FFT-based computational resources, adapted for decoding subcarriers of an Orthogonal Frequency Division Multiple Access/Time Division Multiple Access (OFDMA/TDMA) modulation scheme. Such FFT resources are flexibly programmed at subframe time intervals to decode any subset of a plurality of the subcarriers which populate the entire carrier bandwidth. The subdivision of time (i.e., subframes) and frequency (i.e., subcarriers) can be viewed as a "grid" of decoding resources.

Once the CPC preamble detector 1004 detects the presence of a CPC frame, the modem subsystem 1000 will allocate a subset of the decoding resources 1006 for decoding the CPC transmission. In one exemplary embodiment, the decoding resources are shared between CPC decoding and generic data usage decoding. Accordingly, allocating decoding resources for the CPC frame decreases the amount of resources available to decode useful information data. Consequently, to minimize interruptions in service, the modem subsystem may additionally be required to provide buffering capabilities. In one variant, the interrupted data may be buffered during CPC decoding and decoded once the CPC decoding is finalized (i.e., "caught up"). Alternatively, in a second variant, the CPC frame is buffered and decoded during lulls in the decoding of useful information data (e.g., between the transmission of two frames of useful information system, etc.); i.e., on an opportunistic basis.

In multi ode systems, multiple types of CPC preamble detectors 1004, RF front-ends 1002, and decoding resources 1006 may be intermixed, and or interchanged. In some cases, the functionality of one or more components may be performed by a single component. The numerous possible combinations of the various RF front-ends, CPC preamble detectors and decoding resources are readily appreciated by those of ordinary skill in the arts given the present disclosure.

Exemplary SDR Base Station (BS) Apparatus—

Figure 12:
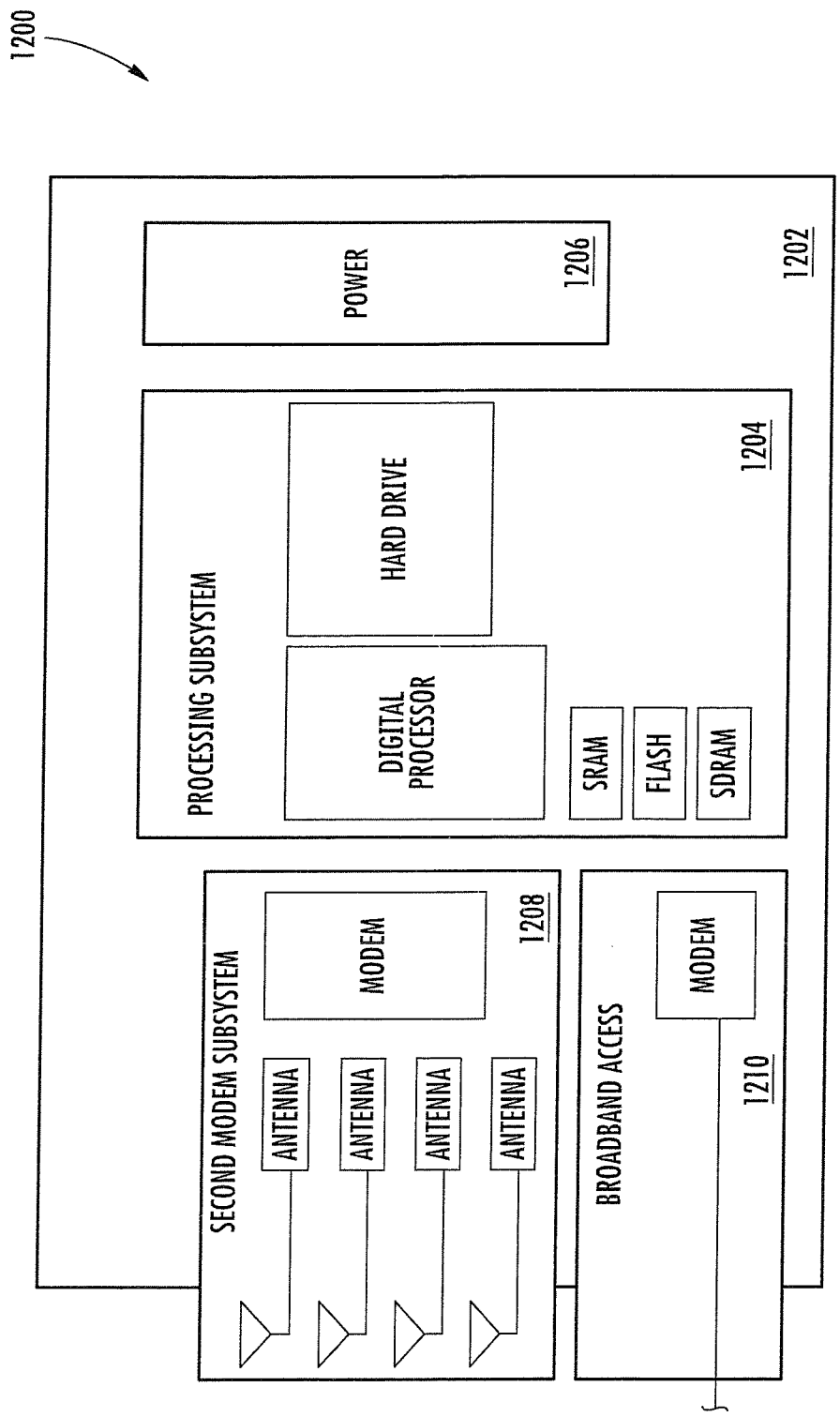
FIG. 12 is a functional block diagram illustrating one embodiment of a base station apparatus adapted to implement the methods of the present invention.

Referring now to FIG. 12, one embodiment of serving base station apparatus 1200 implementing the methods of the present invention is illustrated. The base station apparatus 1200 includes one or more substrate(s) 1202 that further include a plurality of integrated circuits including a processing subsystem 1204 such as a digital signal processor (DSP), microprocessor, gate array, PLD, or plurality of processing components as well as a power management subsystem 1206 that provides power to the base station 1200.

The embodiment of the apparatus 1200 shown in FIG. 12 at a high level includes a modem circuit 1208 configured to provide a segmented public broadcast of basic system information. The segmented public broadcast includes for example a time-varying broadcast of system information (SI), where segments of the system information are each selectively transmitted according to a corresponding priority. In alternate embodiments, the segments may be transmitted via secondary frequency bands, and/or code domains, etc. The modem subsystem includes one or more digital modems and a plurality of antenna radio.

The broadband access circuit 1210 is configured to provide access to the Core Network 106, and potentially other network entities (e.g. eNBs, HeNBs, etc.). The broadband access may comprise for example a simple DSL connection. In other embodiments, the broadband access may comprise a T1, ISDN, satellite link, or DOCSIS cable modem. In one variant, the broadband access only supports authenticated connections, thereby ensuring secure and authorized connections to the network infrastructure. In other variants, the broadband access can provide substantially unauthenticated access to other IP networks, thereby offering a wireless gateway to any connected internets, or the Internet (e.g., such as may be useful with WLAN embodiments of the invention).

The processing subsystem 1204 may comprise a plurality of processors (or multi-core processor(s)). As used herein, the term "processor" is meant generally to include all types of digital processing devices including, without limitation, digital signal processors (DSPs), reduced instruction set computers (RISC), general-purpose (CISC) processors, microprocessors, gate arrays (e.g., FPGAs), PLDs, reconfigurable compute fabrics (RCFs), array processors, secure microprocessors, and application-specific integrated circuits (ASICs). Such digital processors may be contained on a single unitary IC die, or distributed across multiple components.

The processing subsystem 1204 is preferably connected to one or more memory components. As used herein, the term "memory" includes any type of integrated circuit or other storage device adapted for storing digital data including, without limitation, ROM, PROM, EEPROM, DRAM, SDRAM, DDR/2 SDRAM, EDO/FPMS, RLDRAM, SRAM, "flash" memory (e.g., NAND/NOR), and PSRAM. The memory subsystem of the embodiment illustrated in FIG. 12 includes various forms of volatile (e.g. SRAM, SDRAM, etc.) and non-volatile memory such as a hard disk drive (HDD), and or Flash. Additionally, the processing subsystem may also comprise a cache to facilitate processing operations.

In the illustrated embodiment, the processing subsystem additionally includes functional subsystems or modules for: determining segments of basic system information, prioritizing the segments, and efficiently using spectral resources to distribute the various groups of segments to a population of UEs. These subsystems may be implemented in software, firmware and/or hardware, and are logically and/or physically coupled to the processing subsystem.

Alternatively, in another variant, the subsystems or modules may be directly coupled to the transmitter of the subsystem. The illustrated embodiment of the apparatus logically connects the segmentation subsystem, the prioritizing subsystem, and the distribution subsystem.

In one embodiment, the segmentation subsystem includes a database or memory structure localized within the apparatus 1200 adapted to store one or more segments of the public broadcast information. Such segments may be derived at least in part from internal device operations, such as current UE occupancy, current time, current location, etc. In one variant, the segmentation subsystem may comprise a circular buffer or shift register. In alternate embodiments, the subsystem includes one or more interfaces to a centralized network controller, where the centralized network controller provides one or more of segments of the public broadcast information. In yet another embodiment, the segments of public broadcast information may be related to properties which are queried or received from one or more external devices (e.g., nearby WLAN networks, etc.), In yet another embodiment, the segments of the public broadcast information may be set based on an environmental or location consideration, such as cells operating in the vicinity of a hospital.

The prioritizing subsystem of the apparatus may include for example monitoring apparatus for network activity, or memory apparatus adapted to store knowledge of the network activity. The input network parameters are provided to an optimization engine (e.g., algorithm implemented as a computer program executed by the processing subsystem) for dynamically assigning a priority to one or more segments of public broadcast information. It will be appreciated that the segmented public broadcast information may change on a regular or irregular basis; thus, the optimization engine may be run only in response to corresponding changes if desired. Furthermore, the prioritization subsystem may additionally include one or more interfaces adapted to exchange information with neighboring base stations or other network entities (e.g., inter-RAT compatible base stations, Wi-Fi Access Points, etc.).

The distribution subsystem of the apparatus 1200 includes in one embodiment apparatus for broadcasting the various segments of the public broadcast information to the UEs. In one embodiment, the distribution subsystem is a time varying rotation of one or more segments of public broadcast information. In another embodiment, the distribution subsystem provides a time varying length of transmission. The distribution subsystem may also utilize multiple spreading codes (e.g., a CDMA based system), or alternately, other frequency bands (e.g., a FDMA based system), etc. In yet another embodiment, the distribution subsystem provides varying segmented public broadcasts based on one or more network parameters.

The distribution subsystem of the apparatus 1200 of FIG. 12 is adapted to transmit CPC frames for an LTE network, where at least a subset of the segments of the publicly broadcast information are TLVs of varying age levels. In one exemplary implementation, the CPC frames are additionally configured to substantially minimize SDR UE power consumption, by providing variable length transmissions, suited for differing SDR UE requirements.

Methods—

Exemplary methods of operating the aforementioned base station and UE devices previously described according to the invention are now described in greater detail.

In the exemplary embodiment of the invention, one or more segments of basic system information in a wireless (e.g., LTE cellular) radio system are transmitted, and received according to one or more desired reception criteria so as to minimize unnecessary use of spectral resources and/or receiver resources.

Figure 13:
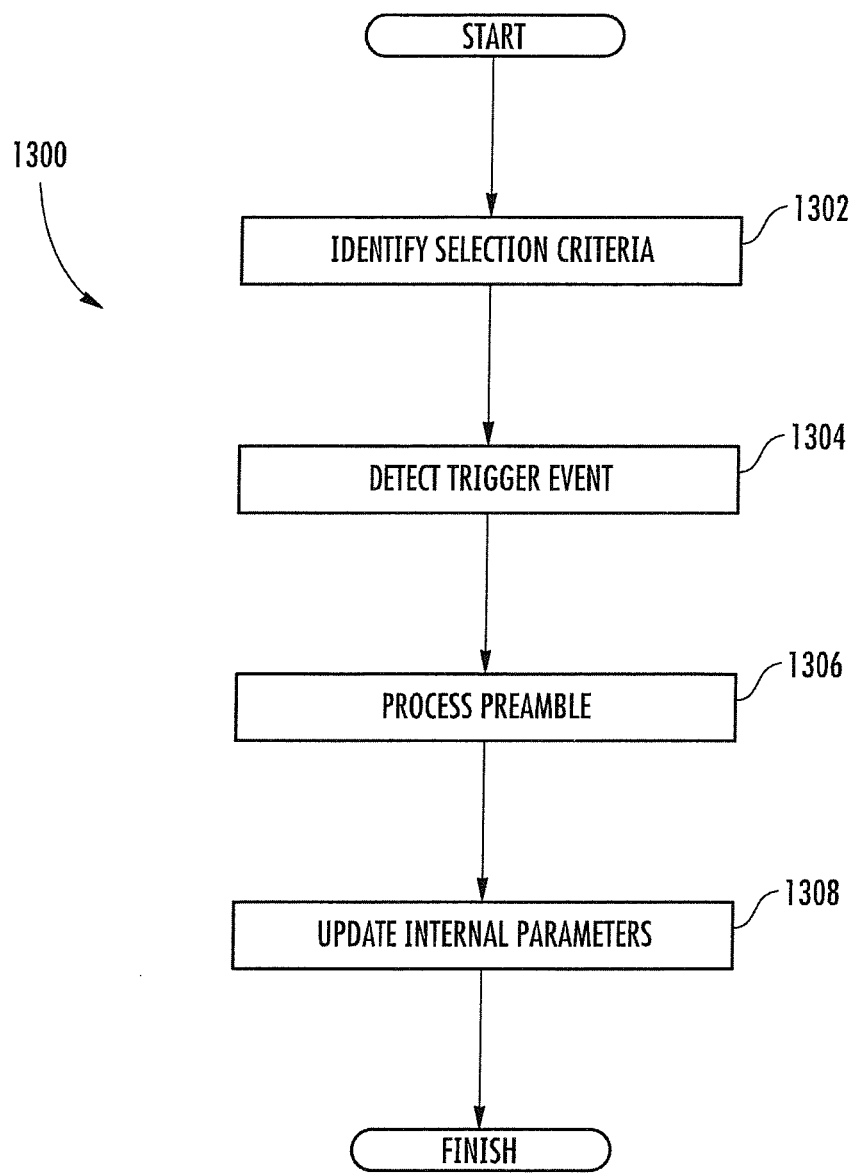
FIG. 13 is a logical flow diagram of one embodiment of a generalized process for receiving selected segments of publicly broadcast system information in accordance with the present invention.

Referring now to FIG. 13, one method of such operation is shown. At step 1302 of the method 1300, the SDR UE identifies one or more selection criteria. In one embodiment, these selection criteria are stored within a preamble detection device. The selection criteria may be related to a prioritized type of segmented context information, or alternatively may be specific to a type of segment of context information, regardless of priority. In another embodiment, these criteria are based on time transmitted, time updated, relevant importance, environmental criteria, functional operation, etc. In yet another embodiment, the selection criteria may be based on one or more values anticipated at a simple preamble detection device. In one such variant, these values include an array of indicia, which provide insight into a larger portion of a segmented public broadcast.

Exemplary selection criteria useful with the invention include (without limitation) CWN (Composite Wireless Network), Operator, Operator Profile, Operator Capabilities, Assigned Channel, Assigned Channel Profile, Regulatory Rule, SA Policy, RAN, RAN Profile, RAN Configuration, Base Station, Base Station Capabilities, Base Station Configuration, Base Station Measurements, Cell, Cell Profile, Cell Capabilities, Cell Configuration, Cell Measurements, etc., and any combination thereof. UE population data (e.g., capabilities of devices, total devices serviced, etc.) may be considered as well.

The multitude and complexity of interrelated network states and transitions which may be evaluated by the SDR UE create a near limitless variety of selection criteria, as will be recognized by those of ordinary skill given the present disclosure.

Furthermore, while the aforementioned selection criteria are substantially UE-centric, it is appreciated that in some embodiments the base station itself may dynamically alter how and when public broadcast messages are received by the UE. For instance, the BS may elect a first method for pilot channel information delivery for "camping" UEs, and a second method for pilot channel message delivery for "new arrival" UEs. Moreover, certain base stations may not support the various modes described herein, in which case the UE must adapt to the prevailing broadcast scheme.

For example, for a UE which is operating with an active radio link may receive a first type of preamble for pilot channel updates, which is limited to very recent changes to various services, or network notifications. Such delivery requires some minor amount of preamble detection complexity, but ensures that minimal additional decoding resources are consumed for administrative needs. Conversely, newly arriving UEs selectively receive a second type of preamble, the preamble indicating that the segments of the transmission are suitable for a newly arriving UE. In this example, a base station may dynamically change the frequency of first and second broadcast types, to suit the various base station requirements. In one illustrative instance, a BS located at a train station may opt to transmit the second types of preambles when a trainload of passengers arrives (e.g., to acclimatize the large number of users quickly), however switch to a first type of preambles when the train station is mostly idle.

Furthermore, in one embodiment, the BS "community" (i.e., two or more designated BSs that cooperate directly or indirectly) can communicate among one another to exchange segmented public broadcast configurations. Such communications can occur over literally any type of communications or network interface, whether wired or wireless, such as for example DSL or DOCSIS broadband, millimeter wave link, satellite, WiMAX interface, etc. Furthermore, inter-base station communication may be supported via extant communication channels of the cellular network (e.g., via existing UMTS/LTE cellular spectrum or channels).

At step 1304, the SDR UE detects a trigger event. In one exemplary embodiment, the trigger event is the detection of a CPC preamble. Detection of a trigger event initiates for example storage of the public broadcast to RAM for later use. In an alternate embodiment, the detection of a trigger event preempts current decoding efforts, such that one or more useful data resources are redirected to evaluate the one or more segments of context information.

In other variants, the mere detection of a CPC preamble initiates evaluation of the context information. Detection of a CPC preamble may additionally be used as the basis for presenting information regarding the CPC context information. Such encoded preamble information may be evaluated without redirecting decoding resources At step 1306, the SDR UE processes and evaluates one or more received messages which suit its selection criteria. To this end, the present invention contemplates in one embodiment the use of a supplemental preamble weighting determination which can, inter alia, determine a unique weighting for a received preamble to determine if the context information of the transmission is a usable update. For instance, a preamble may be weighted with at least two distinct weights, where the distinct weight indicates a change to the context information contained in the transmission. In another example, the preamble may be weighted with a number of distinct weights, where each distinct weight indicates one representative prioritized level (e.g. the oldest or newest transmission) within the accompanying context information. Other possible preamble detection schemes were previously described in the foregoing discussions of FIGS. 11, and 11A.

Such preamble analysis can be based on e.g., a simple matched filter, or correlation subsystem, etc. In this fashion, the SDR UE can easily determine if the incoming received public broadcast is of interest to operation, without causing substantial interruption to its ongoing (or lack of) decoding processes. It will be appreciated that the preamble analysis may change on a regular or irregular basis, such as for example to accommodate the current state of the SDR UE.

Careful resource allocation is highly advantageous, such as when considering systems with generic decoding resources (e.g., OFDMA/TDMA, etc.). For example, in LTE implementations, generic decoding resources are assigned for decoding both CPC and V-CPC type transmissions. Such allocations for pilot channel decoding detract from the overall SDR UE data reception capabilities. Accordingly, the substantial benefits to minimizing unnecessary decoding of CPC and V-CPC channels are expected to outweigh the costs associated with such dedicated methods and apparatus.

Resource allocations may include for example carrier frequencies, time slots, or code channels dedicated for reception of the pilot channel. In one embodiment, the SDR UE of the invention may delay decoding of the pilot channel. For example, the SDR UE may store only a limited number of the segments transmitted to RAM for later decoding. In subsequent transmissions the SDR UE may store other segments. The UE may then read the information and decode the pilot on an as needed basis. The SDR UE effectively minimizes the dedicated resources needed for receiving the public broadcast, by spreading the reception of the entire public broadcast message over time (e.g., decoding four segments of context information, over the span of four transmissions).

In other embodiments, the UE may control its reception of such segments by applying an implicit agreement or synchronization with the transmitting base station. In one such implementation, the UE decodes an initial time stamp transmitted by the base station. In subsequent broadcasts, the UE determines if the subsequent broadcasts are desired for decoding based on its internal initial time stamp. In another embodiment, a multi-mode base station may transmit a pilot channel where each transmission of the pilot channel may be adapted for one or more of the operational modes (e.g. LTE, UMTS, GPRS, GSM, etc.), Each of the serviced UEs individually determines if the subsequent pilot channel transmissions are applicable for their individual purposes.

Lastly, at step 1308 of the method 1300 of FIG. 13, the UE updates its internal parameters and proceeds with normal operation. In one embodiment, the UE may reinitiate step 1302 with a different selection criteria (e.g. a "camping" mode selection criteria).

Example Operation—

Referring back to the exemplary heterogeneous network 100 of FIG. 1, three (3) distinct RATs are located within the same general vicinity; each RAT is actively provisioning independent service coverage. The heterogeneous network includes a first LTE eNB 102A, a second LTE Home eNodeB (HeNB) 104A, and a Wireless-LAN Access Point 108A. Other RATs (not shown) may be used as well, such as one for WiMAX (IEEE Std. 802.16e-2005 entitled "IEEE Standard for Local and metropolitan area networks—Part 16: Air Interface for Fixed and Mobile—Broadband Wireless Access Systems Amendment 2: Physical and Medium Access Control Layers for Combined Fixed and Mobile Operation in Licensed Bands and Corrigendum 1" which is incorporated herein by reference in its entirety). The first eNB and second HeNB are operating under the control of a single network operator. The WLAN AP is operating outside of the single network operator's control, and is privately administered by e.g., a home or business user. A first UE 110 is shown, operating within the coverage of all three networks.

Figure 14:
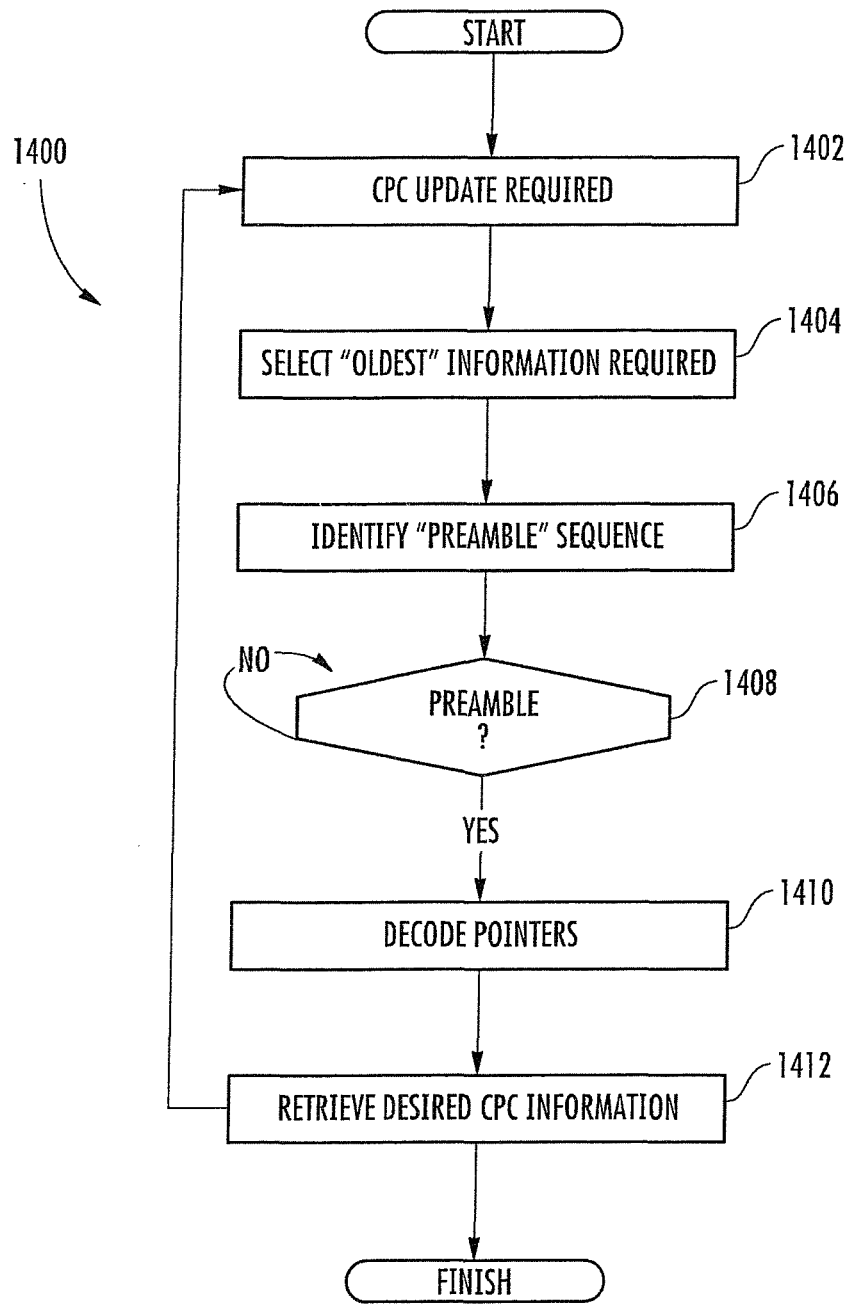
FIG. 14 is a logical flow diagram of one embodiment of a process for receiving selected segments of a time varying CPC frame containing system information, in accordance with the present invention.

FIG. 14 illustrates one implementation of the generalized process for acquiring a CPC frame transmission according to the invention. It will be appreciated that for illustrative reasons, the following discussion of the process 1400 of FIG. 14 and the associated examples include implementation-specific details, such details being provided solely for clarity and convenience and in no way being a requirement of practicing the invention.

In the following discussions, the CPC broadcasts from the serving LTE RATs (102A, 104A) are based on a time-varying scheme prioritized by age level (see the previously discussed time varying scheme 400 of FIG. 4), and, the CPC broadcasts from the serving WAP (108A) are based on a functional scheme prioritized by context content (see the previously described context varying scheme 700 of FIG. 7).

At step 1402 of the method 1400, the UE 110 initializes its CPC preamble detection circuitry 1004. For example, the UE may require CPC information during a change to location update, initial power up, exit from a "sleep" mode, "camping", etc. The initialization may also include as required the retrieval of one or more schemes from memory, such as may be the case during vertical handover (i.e., different networks may have different schemes and/or governing parameters). For instance, the UE determines that LTE RATs 102, 104 prioritize their information broadcasts based on changing time information, whereas the WLAN network 108A prioritizes its information based on user density.

At step 1404, the UE 110 determines the "oldest" information segments from the LTE femtocell 104A in which it is interested. For example, the UE may only be interested in information segments having a "new" or "recent" pointer value. The UE also elects to only receive from the WLAN AP 108 any information based on WLAN occupancy (e.g., only segments with "wlan" pointer values).

At step 1406, the UE 110 sets suitable preamble sequences to trigger detection based on the UE trigger point, and internal parameters stored locally within the UE. The UE sets its preamble detection circuitry 1004 to identify a first preamble from the LTE femtocell indicating a relative age level, and to identify a second preamble from the WLAN AP indicating changes to an occupancy level.

At step 1408, the UE 110 receives a CPC frame transmission. If the UE determines that the CPC frame is suitable for updates, then the UE executes step 1410. If not suitable, the UE state returns to step 1408 (waiting for preamble). For LTE HeNB 104A operation, the UE verifies that the preamble has changed (i.e., indicating one or more updated context information elements). For the WAP 108A, the UE verifies that the preamble matches the specific WLAN occupancy weight. Other CPC messages for WLAN are discarded.

At step 1410, the UE 110 decodes the structure of the suitable received CPC frame. The structure of a CPC frame is RAT specific, and provides the UE with the starting locations for context information. The context information for LTE is hierarchically organized, whereas context information for WLAN is TLV based and does not provide pointers; the UE must determine lengths by decoding the TLV entries sequentially.

Lastly, at step 1412, the UE 110 assigns decoding resources to the context information which is relevant to the UE, and updates its internal operations based on the decoded CPC transmissions.

Vertical Handover to Second Network—

Figure 15:
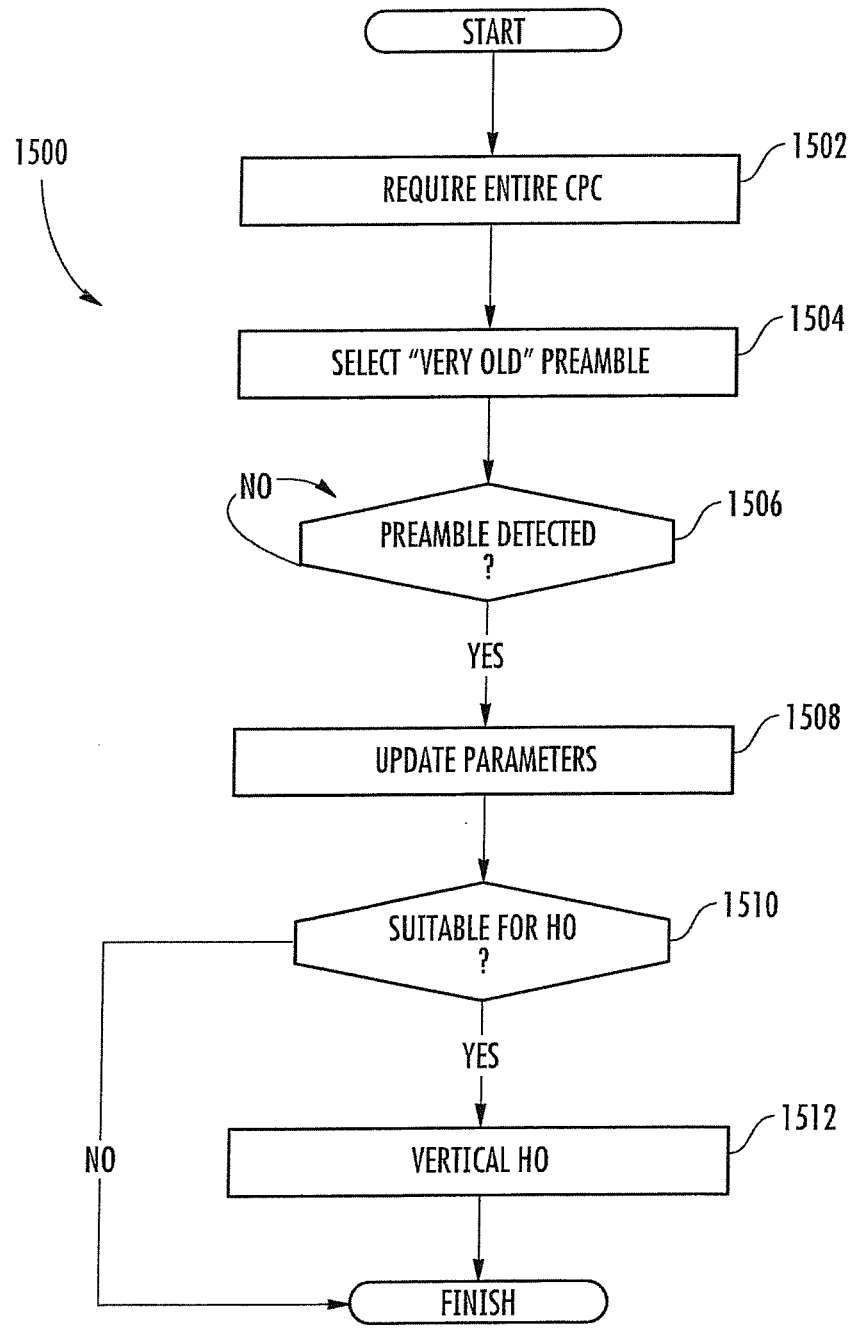
FIG. 15 is a logical flow diagram of one embodiment of a vertical handover process in accordance with the present invention.
Figure 16:
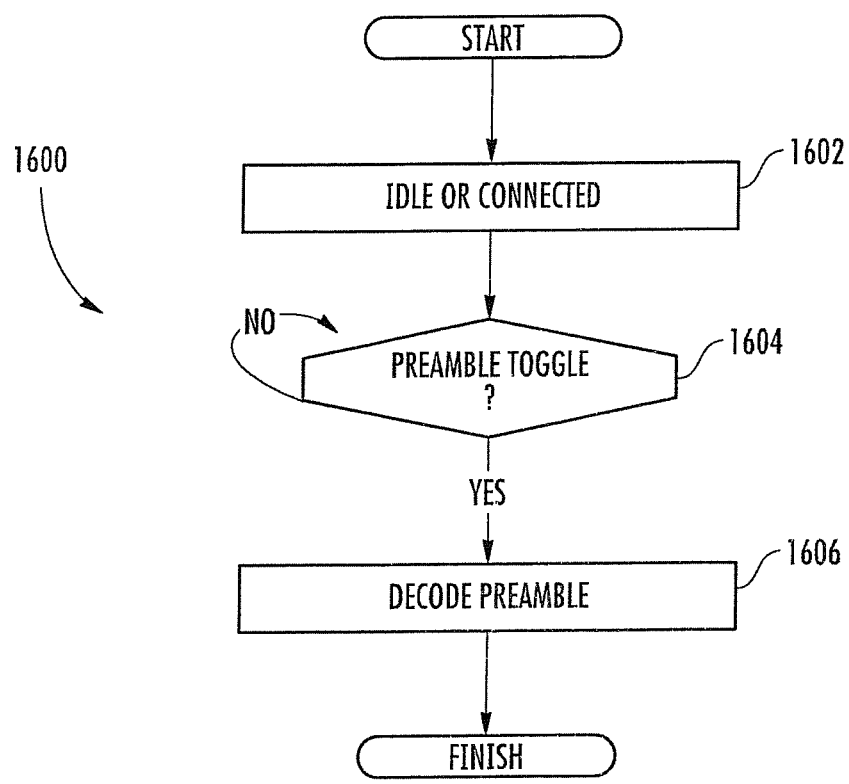
FIG. 16 is a logical flow diagram of a second embodiment of a vertical handover process in accordance with the present invention

In a first illustrative scenario (FIG. 15), the SDR UE 110 performs a vertical handover from the first RAT (served by the LTE eNB 102A) to the second RAT (served by the LTE HeNB 104A). The LTE HeNB is serving a dedicated CPC, where the CPC includes policy information, radio resource selection constraints, etc.

The SDR UE 110 is a new arrival to the LTE HeNB 104A. The UE determines per step 1502 that it requires a comprehensive information set comprising "new", "recent", "old" and "very old". The preambles are weighted with unique identifiers (for example, one simple expansion scheme: "new"=[1, 1, 1, 1], "recent"=[1, −1, 1, −1], "old"=[1, 1, 1, −1], and "very old"=[1, −1, −1, 1]). The SDR UE waits until a preamble is detected with a weighting signature of "very old" per step 1504.

The SDR UE 110 recovers the comprehensive set of context information at step 1506. The UE then updates its internal policy information, radio resource selection constraints, etc. per step 1508. If the UE determines that the HeNB 104A is suitable (step 1510), it performs a vertical handover (step 1512).

In the foregoing sequence of events, the UE 110 was only required to divert a portion of its decoding resources to CPC decoding once it had already established that the CPC was suitable for its information needs. At all other times, the UE of the present invention may maintain its existing links with the first RAT served by the LTE eNB 102A if desired or required.

Business Methods and Rules—

It will be recognized that the foregoing network apparatus and methodologies may be readily adapted to various business models. For example, in one such model, a service provider/network operator may sell, lease, or freely provide (i.e., at no cost, such as via an incentive program) enhanced devices including e.g., femtocells and/or mobile devices or handsets/UEs). Appropriately enabled user equipment may receive enhanced pilot channel messages, and/or more efficiently monitor existing pilot channels, thus increasing the overall perceived quality of a user's experience. In one such embodiment, a dedicated subset of pilot channels are allocated to enabled UEs. Thus, while legacy devices continue to broadly monitor all pilot channels (inefficiently, as previously described herein), invention-enabled devices only monitor the subset of enabled channels, which is markedly more efficient (and considerably improves power consumption and resource allocation).

The aforementioned network apparatus and methodologies may also be readily adapted for operation in accordance with an underlying business rules algorithm or "engine". This business rules engine may comprise for example a software application (and/or firmware, or even hardware aspects), and is implemented in one embodiment as a separate entity at the Core Network, or alternatively within an existing entity residing at the Core Network or other network management process (NMP). The rules engine is in effect a high-layer supervisory process which aids the network operator (or other interested party) in making operational decisions or resource allocations based on important criteria such as financial aspects, user experience enhancement, etc.

In one embodiment, the business rules engine is configured to take into account the revenue and/or profit implications associated with providing resources to one or more users. Accordingly, the exemplary business rules engine can modify the pilot channel behaviors of the system to support a wider base of users (e.g., providing relatively simple, but high quantities of pilot messages) or alternatively, a wider range of services (e.g., more complex pilot channel messages having a greater or more intricate range of functionalities).

For instance, in one example, evaluation of the pilot channel allocations may include an analysis of the incremental cost, revenue, and/or profit associated with the various different allocation options. In some cases, the network provider may determine that new service requests are relatively uncommon, and thus pilot channels are less important. In other cases, the network provider may determine that new users and services are frequently entering and exiting a cell (e.g., such as in the case of the aforementioned commuter or passenger train which traverses the cell multiple times a day, and brings with it numerous different users in a short interval of time), thus requiring an allocation of more pilot channel resources. These "business rules" may be imposed e.g., at time of resource request, and then maintained for a period of time (or until an event triggering a re-evaluation occurs), or alternatively according to a periodic or schedule model (e.g., during certain hours of the day, days of the week, holidays, etc.).

In another embodiment, certain types of context information may be restricted from, or made useful for business and or accounting methods (e.g., "gold", "silver", "vip", etc.), For example, a subscriber willing to pay more money may be privy to enhanced services. A premium subscriber may receive "gold" or "vip" context information; whereas a less premium subscriber may receive "silver" context information. For example, a wireless hotspot may only provision usage of its resources for "vip" users. Users which are not subscribed to these premium groups would not decode the context information.

In yet other embodiments, cognitive pilot channels may be used for advertising one or more nearby services of interest. Such advertisements may be directly profitable, e.g., as a fee based subscription service, or may be indirectly profitable e.g., attracting customers to a desired area, increasing perceived value of a UE handset.

Myriad other schemes for implementing dynamic allocation of resources will be recognized by those of ordinary skill given the present disclosure.

It will be recognized that while certain aspects of the invention are described in terms of a specific sequence of steps of a method, these descriptions are only illustrative of the broader methods of the invention, and may be modified as required by the particular application. Certain steps may be rendered unnecessary or optional under certain circumstances. Additionally, certain steps or functionality may be added to the disclosed embodiments, or the order of performance of two or more steps permuted. All such variations are considered to be encompassed within the invention disclosed and claimed herein.

While the above detailed description has shown, described, and pointed out novel features of the invention as applied to various embodiments, it will be understood that various omissions, substitutions, and changes in the form and details of the device or process illustrated may be made by those skilled in the art without departing from the invention. The foregoing description is of the best mode presently contemplated of carrying out the invention. This description is in no way meant to be limiting, but rather should be taken as illustrative of the general principles of the invention. The scope of the invention should be determined with reference to the claims.

What is claimed is:

1. A method, comprising:
receiving a request for one or more information elements of interest;
receiving, via a wireless interface, at least one data structure comprising a plurality of information elements, the at least one data structure transmitted on a pilot channel;
receiving a plurality of pairs of information elements transmitted on the pilot channel, the individual ones of the pairs comprising a preamble and a pointer, and being respectively associated with the individual ones of the plurality of information elements;
selecting at least one preamble type, the at least one preamble type being selected from a set of preamble types stored in memory, wherein the at least one preamble type is associated with one or more age-related information, the age-related information including an age-related value and a threshold age value;
decoding the preambles corresponding to the plurality of pairs;
comparing the decoded preambles with the selected at least one preamble type;
based on at least the comparison, decoding pointers for a subset of the pairs to determine one or more information element locations; and
based on at least the one or more determined locations, selectively decoding a portion of the information elements of the data structure.

2. The method of claim 1, wherein the locations correspond to one or more data lengths within the data structure.

3. The method of claim 1, wherein at least a subset of the information elements comprise updates on services localized near the position of a base station associated with the pilot channel.

4. The method of claim 3, wherein the services comprises available radio access technologies (RATs).

5. The method of claim 1, wherein the request comprises the at least one preamble type.

6. The method of claim 1, wherein at least a subset of the data structure is repeated on the pilot channel.

7. The method of claim 6, wherein the repeating is based on the length of a frame in a wireless network.

8. The method of claim 1, wherein:
the data structure is stored in memory after transmission on the pilot channel; and
the method further comprises retrieving the data structure from the memory prior to the decoding of the portion.

9. The method of claim 8, wherein the data structure is stored responsive to a detected trigger event.

10. The method of claim 1, wherein the portion of information elements are decoded in a predetermined order based on a weight associated with the decoded preambles.

11. The method of claim 1, wherein the comparing comprises performing at least one correlation operation.

12. The method of claim 1, wherein the one or more age-related information comprises one or more time stamps.

13. A method, comprising:
receiving a request for one or more types of information portions;
receiving a plurality of encoded data elements comprising at least one information portion and at least one preamble;
selecting at least one preamble type, the at least one preamble type being selected from a set of preamble types stored in memory, wherein the at least one preamble type is associated with one or more age-related information, the age-related information including an age-related value and a threshold age value;

decoding a subset of encoded data elements associated with the at least one preamble, where the preamble is associated with the at least one information portion;

decoding the at least one preamble element;

based at least in part on the at least one preamble element, determining the type of the at least one information portion; and based at least in part on the determined type, omitting a decode operation associated with the at least one information portion.

14. A non-transitory computer-readable apparatus configured to store one or more computer programs thereon, the one or more computer programs configured to, when executed:

receive a request, from a higher-layer software operation, for data elements having one or more specified attributes;

receive, via a wireless interface, a pilot channel data structure comprising a plurality of data elements at a plurality of associated data lengths, where individual ones of the data elements comprise at least one associated attribute descriptor and at least one reference element;

select at least one preamble type of interest associated with the data elements, the at least one preamble type of interest being selected from a set of preamble types, wherein the at least one preamble type is associated with one or more age-related information, the age-related information including an age-related value and a threshold age value;

decode the at least one associated attribute descriptor for the individual ones of the data elements to determine respective attributes associated with the individual ones of the data elements;

compare the respective attributes with the one or more specified attributes;

based at least in part on the comparison, selectively decode one or more reference elements for a subset of the individual ones of the plurality of data elements to determine data lengths for the subset; and decode portions of the pilot channel library element based on the determined data lengths.

15. A software-defined radio apparatus, comprising:

a storage device configured to store a set of preamble types;

a wireless interface configured to receive a plurality of preambles respectively associated with a plurality of radio resources; and preamble discrimination logic in data communication with the storage device and the wireless interface, the logic configured to:

receive a request for a one or more information elements of interest;

select at least one preamble type of interest associated with the one or more information elements of interest, the at least one preamble type of interest being selected from the set of preamble types, wherein the at least one preamble type is associated with one or more age-related information, the age-related information including an age-related value and a threshold age value; and forward the at least one preamble type of interest to the wireless interface for identification of instances of the at least one preamble type of interest among the plurality of preambles.

16. The software-defined radio apparatus of claim 15, wherein the wireless interface is further configured to decode one or more pointers so as to determine a location within the plurality of radio resources, the location associated with the instances of the at least one preamble type of interest.

17. The software-defined radio apparatus of claim 15, wherein the request for one or more information elements of interest comprises at least one selection criterion.

18. The software-defined radio apparatus of claim 17, wherein the at least one selection criterion comprises a time value, and the at least one preamble type of interest comprises a time stamp.

* * * * *